(12) United States Patent
Wada et al.

(10) Patent No.: US 6,956,722 B2
(45) Date of Patent: Oct. 18, 2005

(54) LEAD CONDUCTOR MEMBER FOR THIN-FILM MAGNETIC HEAD AND HEAD GIMBAL ASSEMBLY, USING TEMPORARILY CONNECTED TEST CONNECTION PADS

(75) Inventors: Takeshi Wada, Tokyo (JP); Takashi Honda, Tokyo (JP); Masashi Shiraishi, Kwai Chung (HK)

(73) Assignees: TDK Corporation, Tokyo (JP); SAE Magnetics (H.K.) Ltd., Kwai Chung (HK)

( * ) Notice: Subject to any disclaimer, the term of this patent is extended or adjusted under 35 U.S.C. 154(b) by 272 days.

(21) Appl. No.: 10/244,528

(22) Filed: Sep. 17, 2002

(65) Prior Publication Data

US 2003/0053257 A1 Mar. 20, 2003

(30) Foreign Application Priority Data

Sep. 19, 2001 (JP) ..................................... 2001-284642

(51) Int. Cl.$^7$ .............................. G11B 5/54; G11B 5/40
(52) U.S. Cl. .................................. 360/245.8; 360/245.9
(58) Field of Search ........................... 360/245.9, 245.4, 360/245.8, 264.2

(56) References Cited

U.S. PATENT DOCUMENTS

| | | | | |
|---|---|---|---|---|
| 4,996,623 A | | 2/1991 | Erpelding et al. ....... | 360/244.3 |
| 5,870,258 A | * | 2/1999 | Khan et al. .............. | 360/245.9 |
| 6,163,443 A | * | 12/2000 | Hatagami et al. ........... | 360/323 |
| 6,351,352 B1 | * | 2/2002 | Khan et al. .............. | 360/264.2 |
| 6,477,014 B1 | * | 11/2002 | Erpelding ................ | 360/245.9 |
| 6,518,521 B1 | * | 2/2003 | Marek et al. ............. | 200/16 D |
| 6,543,673 B2 | * | 4/2003 | Lennard et al. .......... | 228/179.1 |
| 6,690,546 B2 | * | 2/2004 | Gouo ...................... | 360/244.1 |
| 6,735,052 B2 | * | 5/2004 | Dunn et al. ............. | 360/245.9 |
| 6,872,896 B1 | * | 3/2005 | Young et al. ............. | 200/16 A |
| 2002/0154454 A1 | * | 10/2002 | Kupinski et al. ........... | 360/323 |
| 2003/0174445 A1 | * | 9/2003 | Luo ....................... | 360/245.9 |

FOREIGN PATENT DOCUMENTS

| JP | 6-215513 | | 8/1994 |
|---|---|---|---|
| JP | 2001-283417 A | * | 10/2001 |

* cited by examiner

*Primary Examiner*—Jefferson Evans
(74) *Attorney, Agent, or Firm*—Armstrong, Kratz, Quintos, Hanson & Brooks, LLP

(57) ABSTRACT

A lead conductor member for a thin-film magnetic head, includes a plurality of head connection pads to be connected to a plurality of terminal electrodes of a thin-film magnetic head element, a plurality of external connection pads used for external connections, a plurality of trace conductors, one end of each of the plurality of trace conductors being connected to the plurality of head connection pads and the other ends of the plurality of trace conductors being connected to the plurality of external connection pads, respectively, and at least one pair of test connection pads capable of being temporally and electrically short-circuited with at least one pair of trace conductors of the plurality of trace conductors, respectively.

24 Claims, 27 Drawing Sheets

LEAD CONDUCTOR MEMBER FOR THIN-FILM MAGNETIC HEAD AND HEAD GIMBAL ASSEMBLY, USING TEMPORARILY CONNECTED TEST CONNECTION PADS

FIELD OF THE INVENTION

The present invention relates to a lead conductor member for a thin-film magnetic head, to a head gimbal assembly (HGA), to a testing method of an HGA and to a manufacturing method of an HGA.

DESCRIPTION OF THE RELATED ART

An HGA with a metal suspension on which a lead conductor pattern of trace conductors and connection pads for a thin-film magnetic head element is formed is known from, for example, Ohe et al. (Japanese Patent Publication 06215513 A) and Erpelding et al. (U.S. Pat. No. 4,996,623).

Ohe et al. discloses forming of a lead conductor pattern for connections with a thin-film magnetic head element on a load beam by using photolithography, whereas Erpelding et al. discloses a laminated suspension provided with a flexible plastic material sheet, a stainless steel layer bonded to one surface of the sheet and a copper layer having a pattern of trace conductors for electrical connections and bonded to the other surface of the sheet.

In both of these known arts, the trace conductors for connections with the thin-film magnetic head element are formed on an insulating material layer laminated on a base metal layer. As a result, a capacitor may be produced between the trace conductors and the base metal layer. Since the base metal layer will be grounded, a parasitic capacitance will appear between the lead conductor pattern and the ground. This parasitic capacitance will incorporate with a parasitic inductance produced by the trace conductors and with an inductance component of the thin-film magnetic head element, and thus will cause a resonance near the data transmission frequency. If such resonance occurs, no reading data with a frequency higher than this resonance frequency can be transmitted.

Namely, addition of another conductor pattern such as electrodes or pads to the lead conductor pattern having trace conductors, head connection pads formed at one end of the trace conductors and external connection pads formed at the other end of the trace conductors causes its parasitic capacitance to more increase and its data transmission performance to more deteriorate, and accordingly quality in high frequency signals would extremely deteriorate.

On the other hand, since each of the trace conductors formed in an HGA is extremely fine and short, it is almost impossible to measure a current flowing into a thin-film magnetic head element and also a voltage across the thin-film magnetic head element by directly contacting measurement probes to the trace conductors without additionally making electrodes such as test pads. In fact, in order to measure the electrical characteristics of the head element, it is possible to contact the measurement probes to the head connection pads that are electrically bonded to the thin-film magnetic head element. However, if the measurement probes contact to these head connection pads, a gimbal section around the head connection pads may mechanically deform causing the flying attitude of a magnetic head slider to change. Also, because an area of each head connection pad is very small, it is necessary to use the measurement probes with sharp tips. Such sharp tips of the measurement probes may damage the head connection pads. Therefore, it is undesired to use the head connection pads for measurement of the electrical characteristics of the head element.

It is impossible to contact the measurement probes to the external connection pads because one end connection pads of a link FPC (flexible printed circuit) are generally bonded to these external connection pads. The link FPC is used as is known to extend the electrical connection from the thin-film head element to an HDD. Even if no link FPC is connected to the external connection pads, it is difficult to correctly measure electrical characteristics by contacting the probes to the external connection pads because of influence of the trace conductors to the measured values. It is possible to contact the measurement probes to the other end connection pads of the link FPC. However, correct measurement of electrical characteristics cannot be expected by contacting the probes to these far pads of the link FPC, because the long line of the link FPC has a serious deleterious effect on the measured values.

As aforementioned, addition of electrodes or pads such as test pads to the lead conductor pattern causes its parasitic capacitance to extremely increase and its data transmission performance to seriously deteriorate, and thus quality in high frequency signals extremely deteriorates.

SUMMARY OF THE INVENTION

It is therefore an object of the present invention to provide a lead conductor member for a thin-film magnetic head, an HGA, a testing method of an HGA and a manufacturing method of an HGA, whereby electrical characteristics can be measured without increasing parasitic capacitance and parasitic inductance of the lead conductor member.

According to the present invention, a lead conductor member for a thin-film magnetic head, includes a plurality of head connection pads to be connected to a plurality of terminal electrodes of a thin-film magnetic head element, a plurality of external connection pads used for external connections, a plurality of trace conductors, one end of each of the plurality of trace conductors being connected to the plurality of head connection pads and the other ends of the plurality of trace conductors being connected to the plurality of external connection pads, respectively, and at least one pair of test connection pads capable of being temporally and electrically short-circuited with at least one pair of trace conductors of the plurality of trace conductors, respectively.

The test connection pads are arranged to allow temporally and electrically short-circuiting with the trace conductors. Thus, it is possible for the measurement probes to make the contact with the test connection pads only when the electrical characteristics are measured, and to break the short-circuits after the measurement. Therefore, electrical characteristics of the magnetic head element can be easily measured using these test connection pads without increasing high frequency parasitic capacitance and inductance during actual usage of the HGA even if the lead conductor member of the HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

It is preferred that each of the test connection pads has a size permitting electrical contact of a measurement probe.

It is also preferred that the at least one pair of test connection pads is formed at a position near the at least one pair of trace conductors, and that the position is nearer to the plurality of head connection pads than the plurality of external connection pads. Since the test connection pads are arranged at a position near the head connection pads, it is possible to reduce influence of the trace conductors to the measured values.

It is preferred that the lead conductor member consists of a lead conductor member laminated on a suspension, or of a flexible print circuit member.

According to the present invention, also, a lead conductor member for a thin-film magnetic head, includes a plurality of head connection pads to be connected to a plurality of terminal electrodes of a thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of first trace conductors or the plurality of second trace conductors, respectively.

The test connection pads are arranged to allow temporally and electrically short-circuiting with the trace conductors. Thus, it is possible to make a contact the measurement probes with the test connection pads only when the electrical characteristics is measured, and to break the short-circuits after the measurement. Therefore, electrical characteristics of the head IC chip and/or the magnetic head element can be easily measured using these test connection pads without increasing high frequency parasitic capacitance and inductance during actual usage of the HGA even if the lead conductor member of the HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

It is preferred that each of the test connection pads has a size permitting electrical contact of a measurement probe.

It is also preferred that the at least one pair of test connection pads is formed at a position near the at least one pair of trace conductors of the plurality of first trace conductors, the position being nearer to the plurality of head connection pads than the plurality of IC chip connection pads. Because the test connection pads are arranged at a position near the head connection pads, it is possible to reduce influence of the trace conductors to the measured values of current applied to a write head element or output from a read head element.

It is further preferred that the at least one pair of test connection pads is formed at a position near the at least one pair of trace conductors of the plurality of first trace conductors, the position being nearer to the plurality of IC chip connection pads than the plurality of head connection pads. Because the test connection pads are arranged at a position near the IC chip connection pads, it is possible to reduce influence of the trace conductors to the measured values of reproduced signal applied to a signal amplifying circuit.

It is also preferred that the at least one pair of test connection pads is formed at a position near the at least one pair of trace conductors of the plurality of second trace conductors, the position being nearer to the plurality of IC chip connection pads than the plurality of external connection pads. Because the test connection pads are arranged at a position near the IC chip connection pads, it is possible to reduce influence of the trace conductors to the measured values.

It is preferred that the lead conductor member consists of a lead conductor member laminated on a suspension, or of a flexible print circuit member.

According to the present invention, further, an HGA has a magnetic head slider with at least one thin-film magnetic head element, a suspension for supporting the magnetic head slider, and the aforementioned lead conductor member supported by the suspension. Also, according to the present invention, an HGA has a magnetic head slider with at least one thin-film magnetic head element, a head IC chip, a suspension for supporting the magnetic head slider, and the aforementioned lead conductor member supported by the suspension.

Furthermore, according to the present invention, a testing method of an HGA that has a magnetic head slider with at least one thin-film magnetic head element, a suspension for supporting the magnetic head slider, and a lead conductor member supported by the suspension and provided with trace conductors electrically connected to the at least one thin-film magnetic head element, includes a step of electrically short-circuiting test connection pads of the lead conductor member and the trace conductors, a step of measuring electrical characteristics of the at least one thin-film magnetic head element by electrically contacting measurement probes to the test connection pads, and a step of breaking the electrical short-circuit between the test connection pads and the trace conductors.

Also, according to the present invention, a testing method of an HGA that has a magnetic head slider with at least one thin-film magnetic head element, a head IC chip, a suspension for supporting the magnetic head slider, and a lead conductor member supported by the suspension and provided with trace conductors electrically connected to the at least one thin-film magnetic head element and the head IC chip, includes a step of electrically short-circuiting test connection pads of the lead conductor member and the trace conductors, a step of measuring electrical characteristics of the at least one thin-film magnetic head element or the head IC chip by electrically contacting measurement probes to the test connection pads, and a step of breaking the electrical short-circuit between the test connection pads and the trace conductors.

The test connection pads are temporally and electrically short-circuited with the trace conductors, then measurement probes are contacted with the test connection pads only when the electrical characteristics is measured, and the short-circuits are broken after the measurement. Therefore, electrical characteristics of the head IC chip and/or the magnetic head element can be easily measured using these test connection pads without increasing high frequency parasitic capacitance and inductance during actual usage of the HGA even if the lead conductor member of the HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

It is preferred that the electrical short-circuit step includes a step of ball-bonding the test connection pads to the trace conductors, respectively, or a step of electrically short-circuiting the test connection pads with the trace conductors by contacting connection pins to the test connection pads and to the trace conductors, respectively.

According to the present invention, a manufacturing method of an HGA includes a step of forming on a suspension a lead conductor member including a plurality of head connection pads to be connected to a plurality of terminal electrodes of at least one thin-film magnetic head element, a plurality of external connection pads used for external connections, a plurality of trace conductors, one end of each of the plurality of trace conductors being connected to the plurality of head connection pads and the other ends of the plurality of trace conductors being connected to the plurality of external connection pads, respectively, and at least one pair of test connection pads capable of being temporally and electrically short-circuited with at least one pair of trace conductors of the plurality of trace conductors, respectively, a step of fixing a magnetic head slider with the at least one thin-film magnetic head element to the suspension and electrically connecting the plurality of terminal electrodes of the at least one thin-film magnetic head element with the head connection pads, respectively, a step of electrically short-circuiting the at least one pair of test connection pads and the at least one pair of trace conductors, respectively, a step of measuring electrical characteristics of the at least one thin-film magnetic head element by electrically contacting measurement probes to the at least one pair of test connection pads, and step of breaking the electrical short-circuit between the at least one pair of test connection pads and the at least one pair of trace conductors.

Also, according to the present invention, a manufacturing method of an HGA includes a step of forming on a suspension a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of first trace conductors or the plurality of second trace conductors, respectively, a step of electrically connecting the plurality of terminal electrodes of the head IC chip with the plurality of IC chip connection pads, respectively, a step of fixing a magnetic head slider with the at least one thin-film magnetic head element to the suspension and electrically connecting the plurality of terminal electrodes of the at least one thin-film magnetic head element with the head connection pads, respectively, a step of electrically short-circuiting the at least one pair of test connection pads and the at least one pair of trace conductors, respectively, a step of measuring electrical characteristics of the head IC chip or the at least one thin-film magnetic head element by electrically contacting measurement probes to the at least one pair of test connection pads, and a step of breaking the electrical short-circuit between the at least one pair of test connection pads and the at least one pair of trace conductors.

According to the present invention, further, a manufacturing method of an HGA includes a step of forming on a suspension a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of first trace conductors or the plurality of second trace conductors, respectively, a step of electrically connecting the plurality of terminal electrodes of the head IC chip with the plurality of IC chip connection pads, respectively, a step of electrically short-circuiting the at least one pair of test connection pads and the at least one pair of trace conductors, respectively, a step of measuring electrical characteristics of the head IC chip by electrically contacting measurement probes to the at least one pair of test connection pads, a step of breaking the electrical short-circuit between the at least one pair of test connection pads and the at least one pair of trace conductors, and a step of fixing a magnetic head slider with the at least one thin-film magnetic head element to the suspension and electrically connecting the plurality of terminal electrodes of the at least one thin-film magnetic head element with the head connection pads, respectively.

Further according to the present invention, a manufacturing method of an HGA includes a step of forming a lead conductor member including a plurality of head connection pads to be connected to a plurality of terminal electrodes of at least one thin-film magnetic head element, a plurality of external connection pads used for external connections, a plurality of trace conductors, one end of each of the plurality of trace conductors being connected to the plurality of head connection pads and the other ends of the plurality of trace conductors being connected to the plurality of external connection pads, respectively, and at least one pair of test connection pads capable of being temporally and electrically short-circuited with at least one pair of trace conductors of the plurality of trace conductors, respectively, a step of fixing a magnetic head slider with the at least one thin-film magnetic head element to the lead conductor member and electrically connecting the plurality of terminal electrodes of the at least one thin-film magnetic head element with the head connection pads, respectively, a step of electrically short-circuiting the at least one pair of test connection pads and the at least one pair of trace conductors, respectively, a step of measuring electrical characteristics of the at least one thin-film magnetic head element by electrically contacting measurement probes to the at least one pair of test connection pads, a step of breaking the electrical short-circuit between the at least one pair of test connection pads and the at least one pair of trace conductors, and a step of fixing the lead conductor member to a suspension.

According to the present invention, also, a manufacturing method of an HGA includes a step of forming a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of second trace conductors, respectively, a step of electrically connecting the plurality of terminal electrodes of the head IC chip with the plurality of IC chip connection pads, respectively, a step of electrically short-circuiting the at least one pair of test connection pads and the at least one pair of trace conductors, respectively, a step of measuring electrical characteristics of the head IC chip by electrically contacting measurement probes to the at least one pair of test connection pads, a step of breaking the electrical short-circuit between the at least one pair of test connection pads and the at least one pair of trace conductors, a step of fixing a magnetic head slider with the at least one thin-film magnetic head element to the lead conductor member and electrically connecting the plurality of terminal electrodes of the at least one thin-film magnetic head element with the head connection pads, respectively, and a step of fixing the lead conductor member to a suspension.

According to the present invention, further, a manufacturing method of an HGA includes a step of forming a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of second trace conductors, respectively, a step of electrically connecting the plurality of terminal electrodes of the head IC chip with the plurality of IC chip connection pads, respectively, a step of electrically short-circuiting the at least one pair of test connection pads and the at least one pair of trace conductors, respectively, a step of measuring electrical characteristics of the head IC chip by electrically contacting measurement probes to the at least one pair of test connection pads, a step of breaking the electrical short-circuit between the at least one pair of test connection pads and the at least one pair of trace conductors, a step of fixing the lead conductor member to a suspension, and a step of fixing a magnetic head slider with the at least one thin-film magnetic head element to the lead conductor member and electrically connecting the plurality of terminal electrodes of the at least one thin-film magnetic head element with the head connection pads, respectively.

According to the present invention, still further, a manufacturing method of an HGA includes a step of forming a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of first trace conductors or the plurality of second trace conductors, respectively, a step of electrically connecting the plurality of terminal electrodes of the head IC chip with the plurality of IC chip connection pads, respectively, a step of fixing a magnetic head slider with the at least one thin-film magnetic head element to the lead conductor member and electrically connecting the plurality of terminal electrodes of the at least one thin-film magnetic head element with the head connection pads, respectively, a step of electrically short-circuiting the at least one pair of test connection pads and the at least one pair of trace conductors, respectively, a step of measuring electrical characteristics of the head IC chip or the at least one thin-film magnetic head element by electrically contacting measurement probes to the at least one pair of test connection pads, a step of breaking the electrical short-circuit between the at least one pair of test connection pads and the at least one pair of trace conductors, an step of fixing the lead conductor member to a suspension.

According to the present invention, further, a manufacturing method of an HGA includes a step of forming a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, at least one pair of first test connection pads capable of being temporally and electrically short-circuited with at least one pair of trace conductors of the plurality of first trace conductors, respectively, and at least one pair of second test connection pads capable of being temporally and electrically short-circuited with at least one pair of trace conductors of the plurality of second trace conductors, respectively, a step of electrically connecting the plurality of terminal electrodes of the head IC chip with the plurality of IC chip connection pads, respectively, a step of electrically short-circuiting the at least one pair of second test connection pads and the at least one pair of trace conductors, respectively, a step of measuring electrical characteristics of the head IC chip by electrically contacting measurement probes to the at least one pair of second test connection pads, a step of breaking the electrical short-circuit between the at least one pair of second test connection pads and the at least one pair of trace conductors, a step of fixing a magnetic head slider with the at least one thin-film magnetic head element to the lead conductor member and electrically connecting the plurality of terminal electrodes of the at least one thin-film magnetic head element with the head connection pads, respectively, a step of electrically short-circuiting the at least one pair of first test connection pads and the at least one pair of trace conductors, respectively, a step of measuring electrical characteristics of the at least one thin-film magnetic head element by electrically contacting measurement probes to the at least one pair of first test connection pads, a step of breaking the electrical short-circuit between the at least one pair first test connection pads and the at least one pair of trace conductors, and step of fixing the lead conductor member to a suspension.

Also, according to the present invention, a manufacturing method of an HGA includes a step of forming a lead conductor member including a plurality of head connection pads to be connected to a plurality of terminal electrodes of at least one thin-film magnetic head element, a plurality of IC chip connection pads to be connected to a plurality of terminal electrodes of a head IC chip, a plurality of external connection pads used for external connections, a plurality of first trace conductors, one end of each of the plurality of first trace conductors being connected to the plurality of head connection pads and the other ends of the plurality of first trace conductors being connected to the plurality of IC chip connection pads, respectively, a plurality of second trace conductors, one end of each of the plurality of second trace conductors being connected to the plurality of IC chip connection pads and the other ends of the plurality of second trace conductors being connected to the plurality of external connection pads, respectively, and at least one pair of test connection pads capable of being temporally and electrically short-circuited with at least one pair of trace conductors of the plurality of second trace conductors, respectively, a step of fixing the lead conductor member to a suspension, a step of electrically connecting the plurality of terminal electrodes of the head IC chip with the plurality of IC chip connection pads, respectively, a step of electrically short-circuiting the at least one pair of test connection pads and the at least one pair of trace conductors, respectively, a step of measuring electrical characteristics of the head IC chip by electrically contacting measurement probes to the at least one pair of test connection pads, a step of breaking the electrical short-circuit between the at least one pair of test connection pads and the at least one pair of trace conductors, and a step of fixing a magnetic head slider with the at least one thin-film magnetic head element to the lead conductor member and electrically connecting the plurality of terminal electrodes of the at least one thin-film magnetic head element with the head connection pads, respectively.

The test connection pads are temporally and electrically short-circuited with the trace conductors, then measurement probes are contacted with the test connection pads only when the electrical characteristics is measured, and the short-circuits are broken after the measurement. Therefore, electrical characteristics of the head IC chip and/or the magnetic head element can be easily measured using these test connection pads without increasing high frequency parasitic capacitance and inductance during actual usage of the HGA even if the lead conductor member of the HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

It is preferred that the electrical short-circuit step includes a step of ball-bonding the test connection pads to the trace conductors, respectively, or a step of electrically short-circuiting the test connection pads with the trace conductors by contacting connection pins to the test connection pads and to the trace conductors, respectively.

Further objects and advantages of the present invention will be apparent from the following description of the preferred embodiments of the invention as illustrated in the accompanying drawings.

DESCRIPTION OF THE PREFERRED EMBODIMENTS

Figure 1:
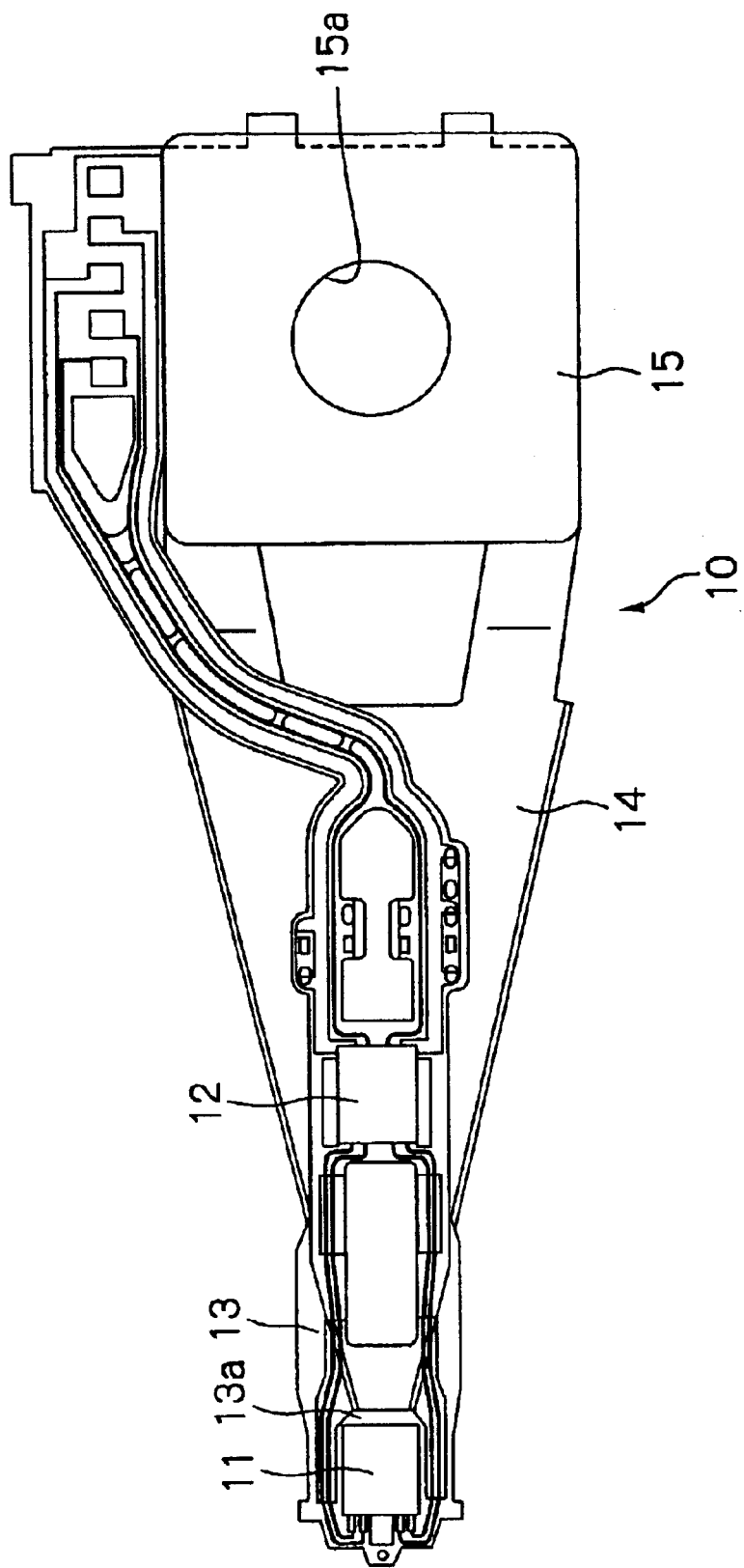
FIG. 1 is a plane view illustrating a structure of an HGA as a preferred embodiment according to the present invention.
Figure 2:
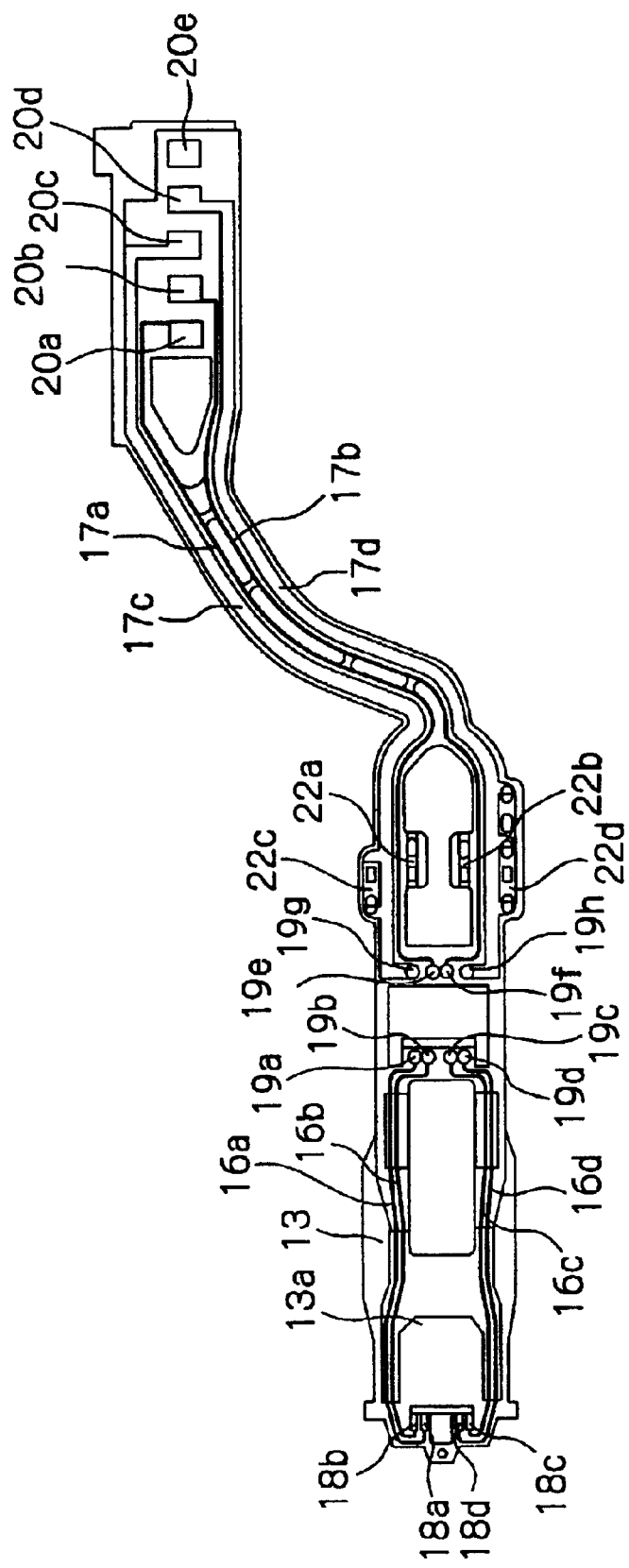
FIG. 2 is a plane view illustrating a structure of a flexure and a lead conductor member formed thereon of the HGA shown in FIG. 1.
Figure 3:
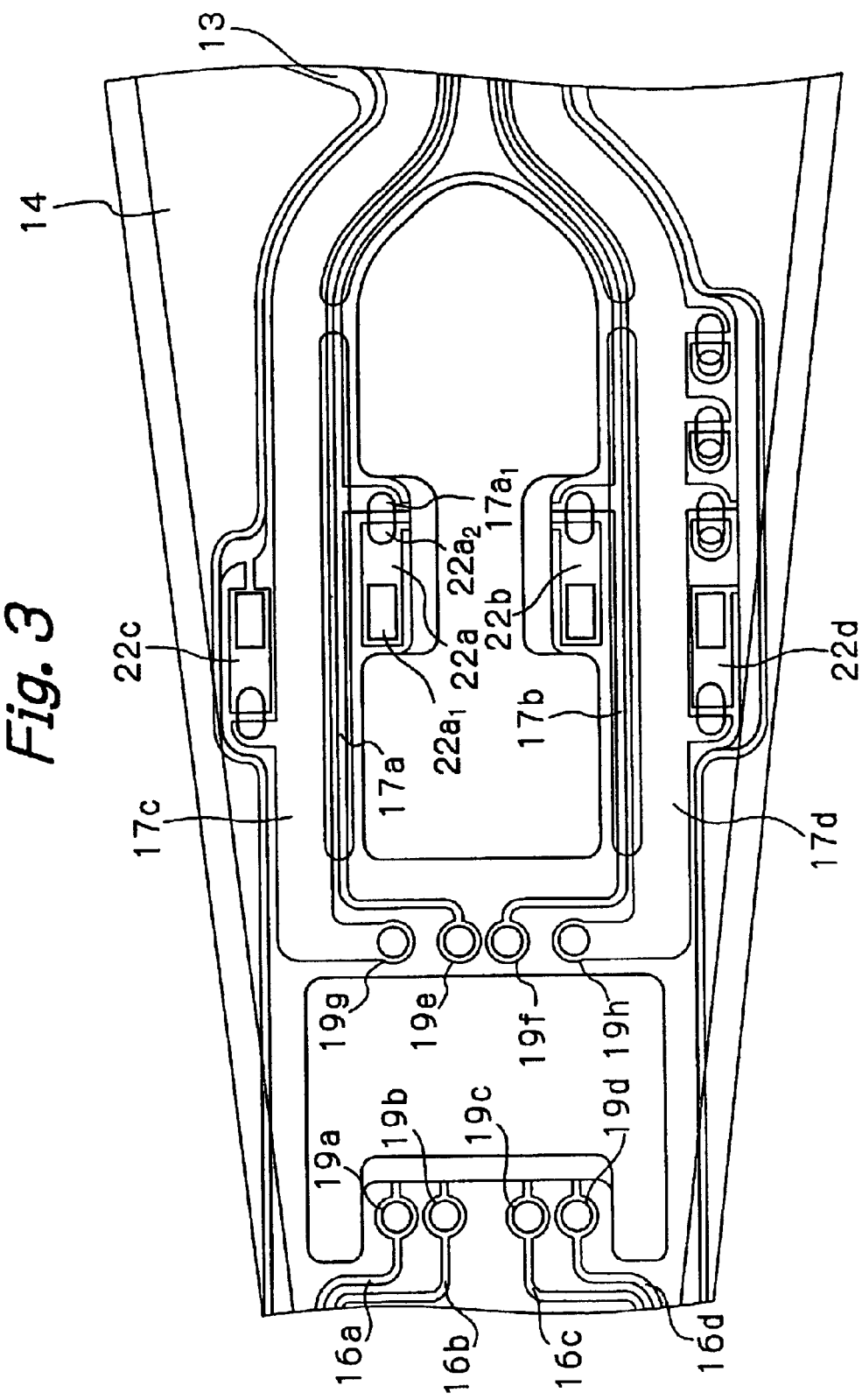
FIG. 3 is an enlarged plane view illustrating a structure of test connection pads shown in FIG. 2.
Figure 4:
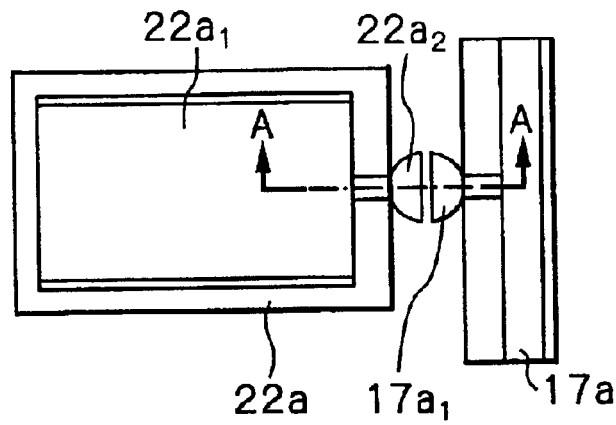
FIG. 4 is a plane view illustrating one test connection pad shown in FIG. 2.
Figure 5:
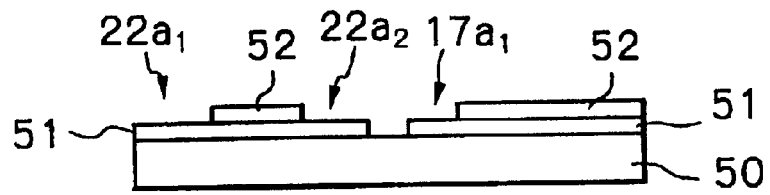
FIG. 5 is a sectional view seen from an A—A line of FIG. 4.

FIG. 1 illustrates a structure of an HGA as a preferred embodiment according to the present invention, FIG. 2 illustrates a structure of a flexure and a lead conductor member formed thereon of the HGA shown in FIG. 1, FIG. 3 illustrates an enlarged structure of test connection pads shown in FIG. 2, FIG. 4 illustrates one test connection pad shown in FIG. 2, FIG. 5 shows a sectional view seen from an A—A line of FIG. 4.

As shown in FIG. 1, the HGA is assembled by fixing a magnetic head slider 11 having at least one thin-film magnetic head element to a top end section of a suspension 10 and by mounting a drive IC chip 12 for driving the head element and for amplifying a read-out signal from the head element on a middle section of this suspension 10.

The suspension 10 is substantially constituted by a resilient metal flexure 13 which carries the slider 11 at its one end section, a resilient metal load beam 14 that supports and fixes the flexure 13, a metal base plate 15 fixed to a base end section of the load beam 14.

The magnetic head slider 11 has the at least one thin-film magnetic head element consisting of a write head element and a magnetoresistive effect (MR) read head element. Although it is a mere example, the size of the magnetic head slider 11 is 1.25 mm×1.0 mm×0.3 mm.

The flexure 13 has a flexible tongue 13a depressed by a dimple (not shown) formed on the load beam 14 and has elasticity for flexibly supporting by the tongue 13a the magnetic head slider 11 to provide a stable attitude to the slider. The flexure 13 is made of in this embodiment a stainless steel plate (for example SUS304TA) with a thickness of about 25 μm and a substantially constant width.

A lead conductor member of a thin film conductive pattern is formed on the flexure 13 along its whole length. This lead conductor member has four first trace conductors 16a–16d and four second trace conductors 17a–17d.

One ends of the first trace conductors 16a–16d are connected to four head connection pads 18a–18d formed at one end section (top end section) of the flexure 13. These head connection pads 18a–18d are electrically connected to four terminal electrodes of the magnetic head slider 11. The other ends of the first trace conductors 16a–16d are connected to four pads 19a–19d of eight IC chip connection pads 19a–19h formed on the middle section of the flexure 13 and electrically connected to eight terminal electrodes of the IC chip 12.

One ends of the second trace conductors 17a–17d are connected to the IC chip connection pads 19e–19h. The other ends of the second trace conductors 17a–17d are connected to four pads 20a–20d of five external connection pads 20a–20e formed on the other end section (rear end section) of the flexure 13. The remaining pad 20e is in this embodiment a dummy pad. To the external connection pads 20a–20e, in fact, a link FPC (flexible print circuit) not shown will be connected. In this embodiment, one pair of the second trace conductors 17a and 17b are signal and control lines and the other pair of the second trace conductors 17c and 17d are power supply lines.

As apparently shown in FIGS. 3 to 5, the lead conductor member in this embodiment further has four test connection pads 22a–22d capable of temporally shorting with the second trace conductors 17a–17d, respectively. These test connection pads 22a–22d are arranged at a position near to the IC chip 12.

As shown a section of a part of the test connection pads in FIG. 5, a thin film pattern of the lead conductor member is formed by sequentially depositing a polyimide layer 50 with a thickness of about 10 μm (lower insulation layer), a patterned Cu layer 51 with a thickness of about 10 μm (first and second trace conductors 16a–16d and 17a–17d, head connection pads 18a–18d, IC chip connection pads 19e–19h, external connection pads 20a–20e or test connection pads 22a–22d), and a polyimide layer 52 with a thickness of about 3 μm (upper insulation layer) directly on the flexure 13 in this order. In a modification, a preliminarily deposited multi-layered film of the conductive pattern may be laminated on the flexure 13.

Within inner regions of the head connection pads 18a–18d, IC chip connection pads 19e–19h and external connection pads 20a–20e, a Ni layer and an Au layer are sequentially deposited on the Cu layer and there is no upper insulation layer. Similar to this, within regions ($22a_1$, FIGS. 4 and 5) of the test connection pads 22a–22d, to which the measurement probes will be contact, within regions ($22a_2$, FIGS. 4 and 5) of the test connection pads 22a–22d, to which the second trace conductors 17a–17d will be temporally connected, and within regions ($17a_1$, FIGS. 4 and 5) of the second trace conductors 17a–17d, to which the test connection pads 22a–22d will be temporally connected, a Ni layer and an Au layer are sequentially deposited on the Cu layer and there is no upper insulation layer.

The load beam 14 has elasticity for depressing the magnetic head slider 11 toward the direction of a magnetic disk in operation so as to provide a stable flying height. This load beam 14 is made of in this embodiment a resilient stainless steel plate with a thickness of about 60–65 μm and supports the flexure 13 along its whole length. The load beam 14 has a shape with a width that narrows with approaching to its top end. Fixing of the flexure 13 to the load beam 14 is performed by spot welding at a plurality of points using a laser beam for example. As will be noted, in this embodiment, the suspension has a three-pieces structure constituted by individual components of the flexure 13, the load beam 14 and the base plate 15. In such three-pieces structure, stiffness of the flexure 13 is set to be lower than that of the load beam 14.

The base plate 15 is made of a stainless steel plate or an iron plate with a thickness larger than that of the load beam 14, and is fixed to the base end section of the load beam 14 by spot welding using a laser beam for example. The HGA will be attached to each support arm (not shown) by mechanically swaging an attachment part 15a of the base plate 15 to the support arm.

Figure 6:
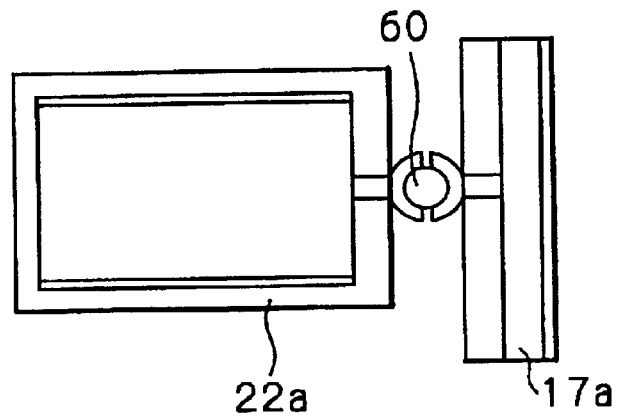
FIG. 6 is a plane view illustrating an example of a short-circuit method between a test connection pad and a trace conductor.
Figure 7:
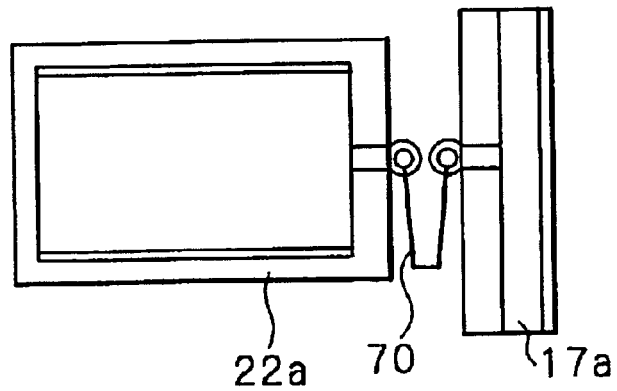
FIG. 7 is a plane view illustrating another example of a short-circuit method between a test connection pad and a trace conductor.

As shown in FIGS. 3 to 5, the test connection pads 22a–22d are arranged to have spaces with the respective second trace conductors 17a–17d, so as to be temporally short-circuited with the second trace conductors 17a–17d when required. This temporal short-circuit may be established by a ball-bonding using a gold ball 60 as shown in FIG. 6, or shorting using a connection pin 70 as shown in FIG. 7.

Each of the test connection pads 22a–22d has a size for permitting easy contact of the measurement probe. Although each test connection pad has a substantially rectangular shape in this embodiment, any shape such as an other polygonal shape, an ellipse shape or a circular shape may be adopted.

It is desired that the test connection pads 22a–22d are arranged at a position as nearer as the IC chip 12 because the measured values are unaffected by the trace conductors. However, if it is difficult to locate them near the IC chip 12 due to no space, any optional position may be selected to form the test connection pads.

Figure 8:
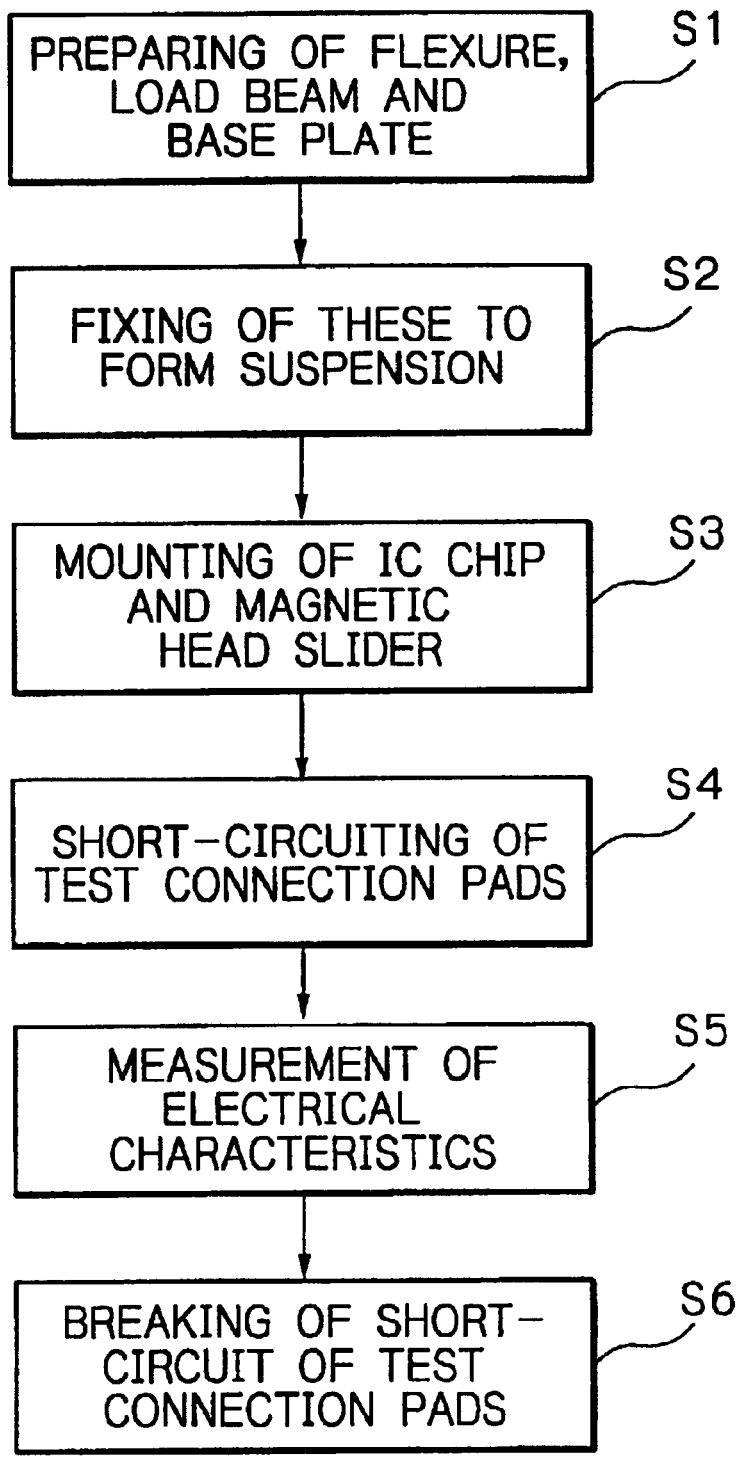
FIG. 8 is a flow chart illustrating a part of a fabrication process of a manufacturing method of an HGA in the embodiment of FIG. 1.

FIG. 8 illustrates a part of fabrication process of a manufacturing method of an HGA in the embodiment of FIG. 1. Hereinafter, the manufacturing process will be described in detail with reference to this figure.

First, a flexure 13 with a lead conductor member laminated thereon, a load beam 14 and a base plate 15 are prepared (step S1).

Then, a suspension 10 is fabricated by fixing the flexure 13, the load beam 14 and the base plate 15 with each other by means of spot welding using a laser beam (step S2).

Then, an IC chip 12 and a magnetic head slider 11 are mounted on the suspension 10 (step S3). The mounting of the IC chip 12 is performed by electrically bonding its electrode terminals to IC chip connection pads 19a–19h of the lead conductor member formed on the flexure 13 by means of a flip-chip bonding using solder or gold bumps, and then by filling an underfill material into a space between the lead conductor member and the IC chip 12 if necessary. The mounting of the magnetic head slider 11 is performed by adhering the slider 11 to a tongue 13a of the flexure 13, and by electrically connecting its electrode terminals to head element connection pads 18a–18d by means of soldering or ball-bonding.

Then, test connection pads 22a–22d and second trace conductors 17a–17d are electrically short-circuited, respectively (step S4). These short-circuits may be achieved by gold-ball bonding or by using connection pins.

Then, measurement probes of a measuring instrument are contacted to the test connection pads 22a and 22b for measuring signals inputted into or outputted from the IC chip 12 through the second trace conductors 17a and 17b, the measurement probes are contacted to the test connection pads 22c and 22d for measuring power voltage supplied to the IC chip 12 through the second trace conductors 17c and 17d, or the measurement probes are contacted to these four test connection pads 22a–22d for measuring all of these signals and power voltages, and thus electrical characteristics of the IC chip 12 is obtained (step S5). If it is judged that the HGA measured is a defective from thus obtained electrical characteristics, the IC chip may be re-mounted or adjusted, or the HGA may be discarded.

Thereafter, the gold balls or the solders are removed to break the short-circuiting between the test connection pads 22a–22d and the second trace conductors 17a–17d, and thus the HGA is brought to completion (step S6).

Electrical characteristics of the thin-film magnetic head element will be thereafter measured by means of a read/write tester for example in this embodiment.

The flexure, load beam and base plate of the suspension 10 is not limited to the aforementioned structure but various modifications can be adopted as a matter of course.

As will be noted according to this embodiment, the test connection pads 22a–22d are electrically shorted to the second trace conductors 17a–17d and the measurement probes are contacted to the test connection pads only when the electrical characteristics is measured, and the short-circuits are broken after the measurement. Therefore, electrical characteristics of the IC chip can be easily measured using these test connection pads 22a–22d without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, all of the test connection pads 22a–22d are temporally short-circuited to the second trace conductors 17a–17d. However, in modifications, only necessary test connection pads may be temporally short-circuited to the second trace conductors.

Also, in this embodiment, the lead conductor member has four second trace conductors, namely two signal and control lines and two power supply lines. However, in modifications, five second trace conductors including an individual control line separated from two signal lines may be provided.

Figure 9:
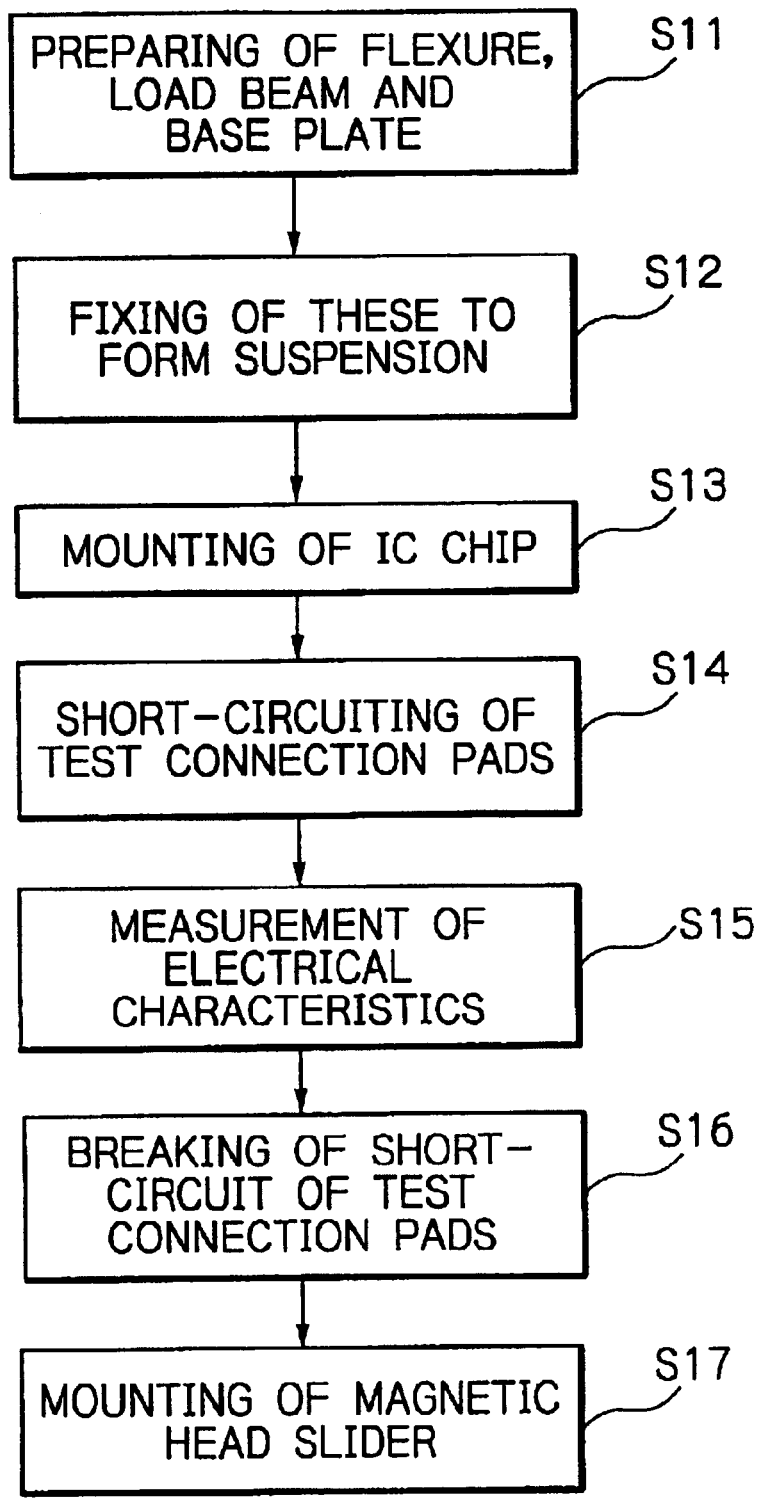
FIG. 9 is a flow chart illustrating a part of fabrication process in a modification of the manufacturing method of FIG. 8.

FIG. 9 illustrates a part of fabrication process in a modification of the manufacturing method of FIG. 8. Hereinafter, the modification in the manufacturing process will be described in detail with reference to this figure.

First, a flexure 13 with a lead conductor member laminated thereon as the aforementioned embodiment, a load beam 14 and a base plate 15 are prepared (step S11).

Then, a suspension 10 is fabricated by fixing the flexure 13, the load beam 14 and the base plate 15 with each other by means of spot welding using a laser beam (step S12).

Then, only an IC chip 12 is mounted on the suspension 10 (step S13). The mounting of the IC chip 12 is performed by electrically bonding its electrode terminals to IC chip connection pads 19a–19h of the lead conductor member formed on the flexure 13 by means of a flip-chip bonding using solder or gold bumps, and then by filling an underfill material into a space between the lead conductor member and the IC chip 12 if necessary.

Then, test connection pads 22a–22d and second trace conductors 17a–17d are electrically short-circuited, respectively (step S14). These short-circuits may be achieved by gold-ball bonding or by using connection pins.

Then, measurement probes of a measuring instrument are contacted to the test connection pads 22a and 22b for measuring signals inputted into or outputted from the IC chip 12 through the second trace conductors 17a and 17b, the measurement probes are contacted to the test connection pads 22c and 22d for measuring power voltage supplied to the IC chip 12 through the second trace conductors 17c and 17d, or the measurement probes are contacted to these four test connection pads 22a–22d for measuring all of these signals and power voltages, and thus electrical characteristics of the IC chip 12 is obtained (step S15). If it is judged that the suspension with the IC chip measured is a defective from thus obtained electrical characteristics, the IC chip may be re-mounted or adjusted, or the suspension with the IC chip may be discarded.

Thereafter, the gold balls or the solders are removed to break the short-circuiting between the test connection pads 22a–22d and the second trace conductors 17a–17d (step S16).

Then, a magnetic head slider 11 is mounted on the suspension to (step S17), and thus the HGA is brought to completion. The mounting of the magnetic head slider 11 is performed by adhering the slider 11 to a tongue 13a of the flexure 13, and by electrically connecting its electrode terminals to head element connection pads 18a–18d by means of soldering or ball-bonding.

The other configurations, operations and advantages in this modification are substantially the same as those in the embodiment of FIG. 1.

Figure 10:
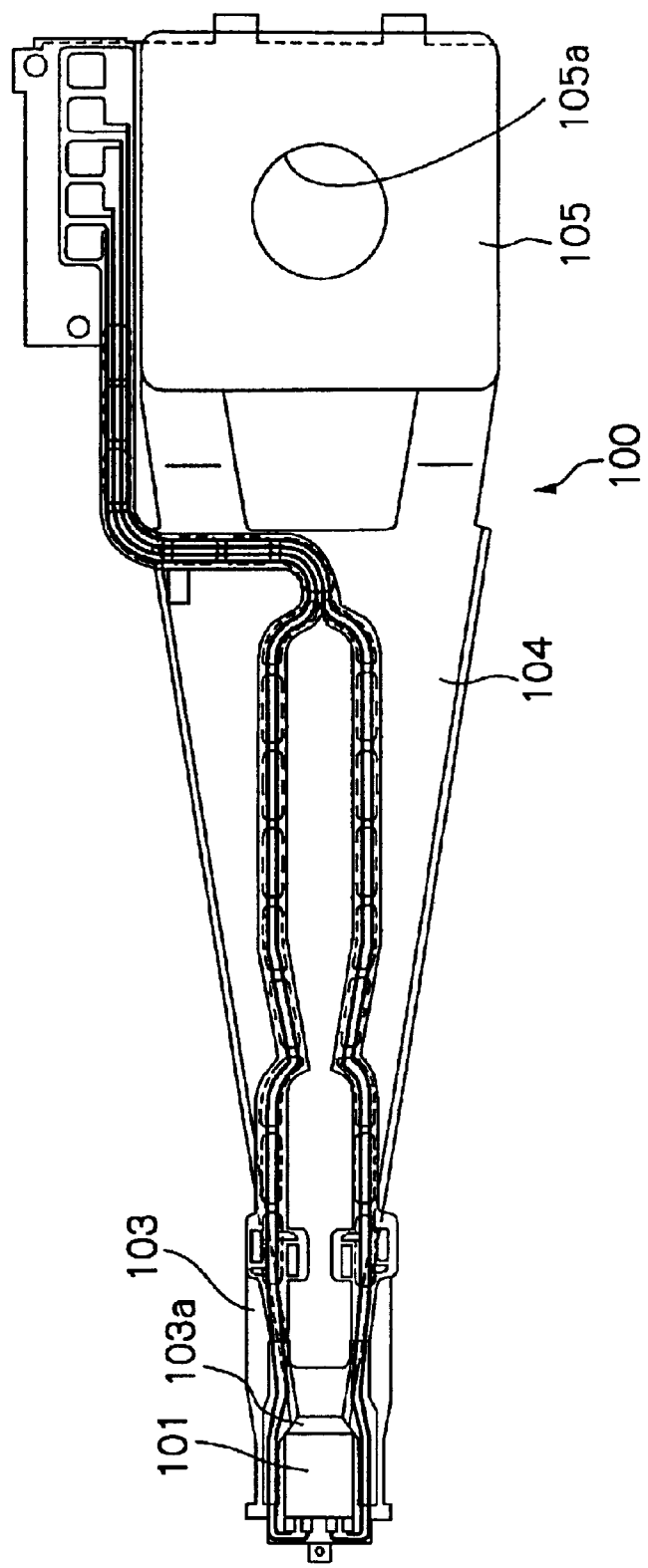
FIG. 10 is a plane view illustrating a structure of an HGA as another embodiment according to the present invention.
Figure 11:
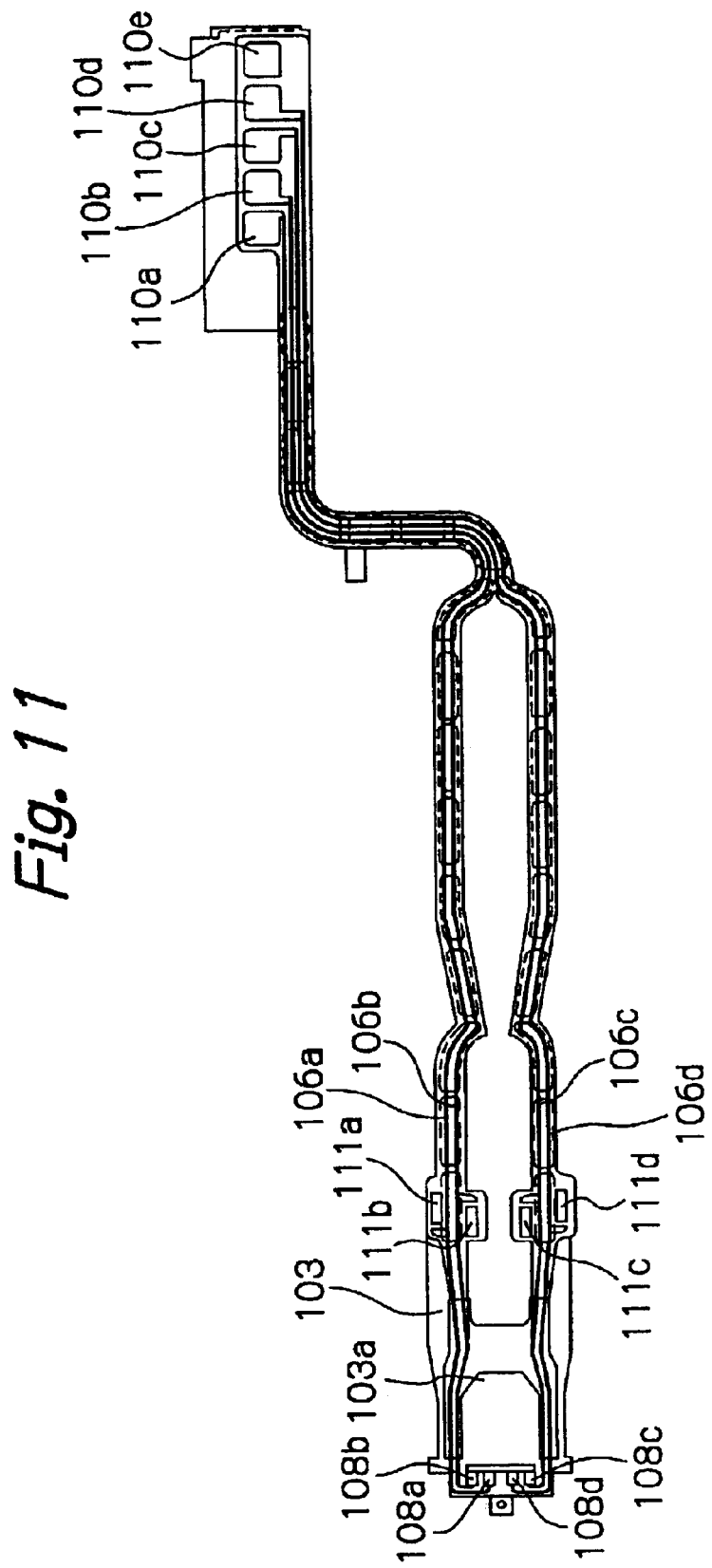
FIG. 11 is a plane view illustrating a structure of a flexure and a lead conductor member formed thereon of the HGA shown in FIG. 10.
Figure 12:
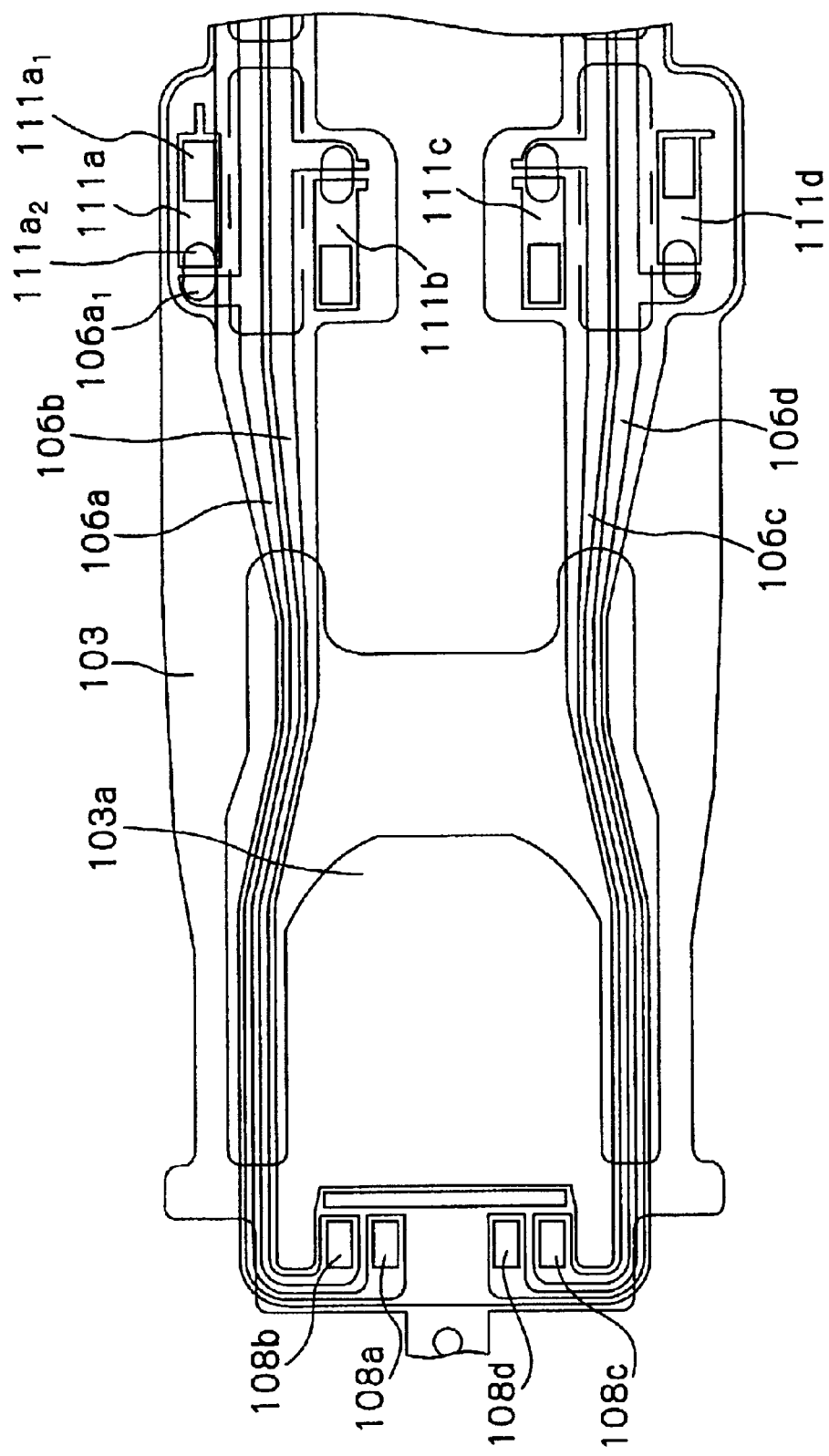
FIG. 12 is an enlarged plane view illustrating a structure of test connection pads shown in FIG. 11.

FIG. 10 illustrates a structure of an HGA as another embodiment according to the present invention, FIG. 11 illustrates a structure of a flexure and a lead conductor member formed thereon of the HGA shown in FIG. 10, and FIG. 12 illustrates an enlarged structure of test connection pads shown in FIG. 11.

As shown in FIG. 10, the HGA is assembled by fixing a magnetic head slider 101 having at least one thin-film magnetic head element to a top end section of a suspension 100.

The suspension 100 is substantially constituted by a resilient metal flexure 103 which carries the slider 101 at its one end section, a resilient metal load beam 104 that supports and fixes the flexure 103, a metal base plate 105 fixed to a base end section of the load beam 104.

The magnetic head slider 101 has the at least one thin-film magnetic head element consisting of a write head element and an MR read head element. Although it is a mere example, the size of the magnetic head slider 101 is 1.25 mm×1.0 mm×0.3 mm.

The flexure 103 has a flexible tongue 103a depressed by a dimple (not shown) formed on the load beam 104 and has elasticity for flexibly supporting by the tongue 103a the magnetic head slider 101 to provide a stable attitude to the slider. The flexure 103 is made of in this embodiment a stainless steel plate (for example SUS304TA) with a thickness of about 25 $\mu$m and a substantially constant width.

A lead conductor member of a thin film conductive pattern is formed on the flexure 103 along its whole length. This lead conductor member has four trace conductors 106a–106d.

One ends of the trace conductors 106a–106d are connected to four head connection pads 108a–108d formed at one end section (top end section) of the flexure 103. These head connection pads 108a–108d are electrically connected to four terminal electrodes of the magnetic head slider 101. The other ends of the trace conductors 106a–106d are connected to four pads 110a–110d of five external connection pads 110a–110e formed on the other end section (rear end section) of the flexure 103. The remaining pad 110e is in this embodiment a dummy pad. To the external connection pads 110a–110e, in fact, a link FPC not shown will be connected.

As apparently shown in FIG. 12, the lead conductor member in this embodiment further has four test connection pads 111a–111d capable of temporally shorting with the trace conductors 106a–106d, respectively. These test connection pads 111a–111d are arranged at a position near to the magnetic head slider 101.

As well as that shown in FIG. 5, a thin film pattern of the lead conductor member is formed by sequentially depositing a polyimide layer with a thickness of about 10 $\mu$m (lower insulation layer), a patterned Cu layer with a thickness of about 10 $\mu$m (trace conductors 106a–106d, head connection pads 108a–108d, external connection pads 110a–110e or test connection pads 111a–111d), and a polyimide layer with a thickness of about 3 $\mu$m (upper insulation layer) directly on the flexure 103 in this order. In a modification, a preliminarily deposited multi-layered film of the conductive pattern may be laminated on the flexure 103.

Within inner regions of the head connection pads 108a–108d and external connection pads 110a–110e, a Ni layer and an Au layer are sequentially deposited on the Cu layer and there is no upper insulation layer. Similar to this, within regions ($111a_1$) of the test connection pads 111a–111d, to which the measurement probes will be contact, within regions ($111a_2$) of the test connection pads 111a–111d, to which the trace conductors 106a–106d will be temporally connected, and within regions ($106a_1$) of the trace conductors 106a–106d, to which the test connection pads 111a–111d will be temporally connected, a Ni layer and an Au layer are sequentially deposited on the Cu layer and there is no upper insulation layer.

The load beam 104 has elasticity for depressing the magnetic head slider 101 toward the direction of a magnetic disk in operation so as to provide a stable flying height. This load beam 104 is made of in this embodiment a resilient stainless steel plate with a thickness of about 60–65 $\mu$m and supports the flexure 103 along its whole length. The load beam 104 has a shape with a width that narrows with approaching to its top end. Fixing of the flexure 103 to the load beam 104 is performed by spot welding at a plurality of points using a laser beam for example. As will be noted, in this embodiment, the suspension has a three-pieces structure constituted by individual components of the flexure 103, the load beam 104 and the base plate 105. In such three-pieces structure, stiffness of the flexure 103 is set to be lower than that of the load beam 104.

The base plate 105 is made of a stainless steel plate or an iron plate with a thickness larger than that of the load beam 104, and is fixed to the base end section of the load beam 104 by spot welding using a laser beam for example. The HGA will be attached to each support arm (not shown) by mechanically swaging an attachment part 105a of the base plate 105 to the support arm.

As shown in FIG. 12, the test connection pads 111a–111d are arranged to have spaces with the respective trace conductors 106a–106d, so as to be temporally short-circuited with the trace conductors 106a–106d when required. This temporary short-circuit may be established by a ball-bonding using a gold ball, or shorting using a connection pin.

Each of the test connection pads 111a–111d has a size for permitting easy contact of the measurement probe. Although each test connection pad has a substantially rectangular shape in this embodiment, any shape such as an other polygonal shape, an ellipse shape or a circular shape may be adopted.

It is desired that the test connection pads 111a–111d are arranged at a position as nearer as the magnetic head element because the measured values are unaffected by the trace conductors. However, if it is difficult to locate them near the head element due to no space, any optional position may be selected to form the test connection pads.

Figure 13:
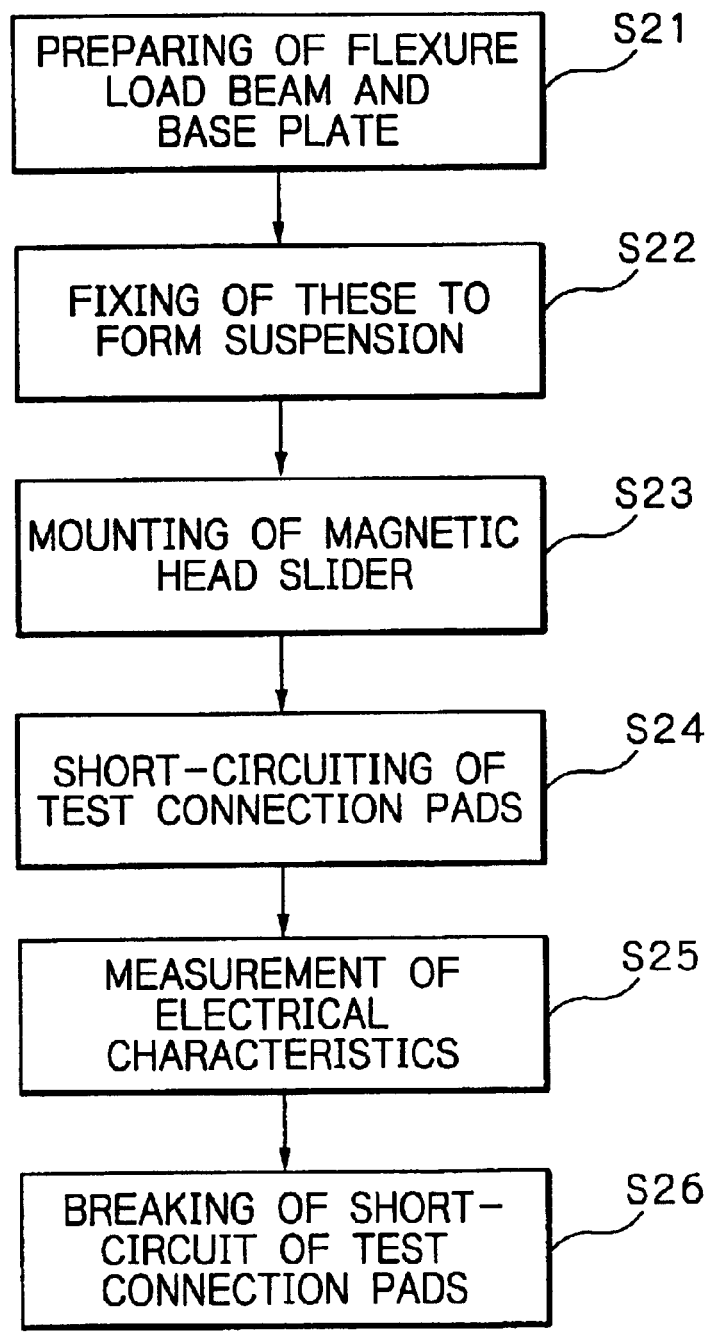
FIG. 13 is a flow chart illustrating a part of fabrication process of a manufacturing method of an HGA in the embodiment of FIG. 10.

FIG. 13 illustrates a part of fabrication process of a manufacturing method of an HGA in the embodiment of FIG. 10. Hereinafter, the manufacturing process will be described in detail with reference to this figure.

First, a flexure 103 with a lead conductor member laminated thereon, a load beam 104 and a base plate 105 are prepared (step S21).

Then, a suspension 100 is fabricated by fixing the flexure 103, the load beam 104 and the base plate 105 with each other by means of spot welding using a laser beam (step S22).

Then, a magnetic head slider 101 is mounted on the suspension 100 (step S23). The mounting of the magnetic head slider 101 is performed by adhering the slider 101 to a tongue 103a of the flexure 103, and by electrically connecting its electrode terminals to head element connection pads 108a–108d by means of soldering or ball-bonding.

Then, test connection pads 111a–111d and trace conductors 106a–106d are electrically short-circuited, respectively (step S24). These short-circuits may be achieved by gold-ball bonding or by using connection pins.

Then, measurement probes of a measuring instrument are contacted to the test connection pads 111a and 111b for measuring signals inputted into or outputted from the MR read head element for example of the thin-film magnetic head element through the trace conductors 106a and 106b, the measurement probes are contacted to the test connection pads 111c and 111d for measuring signal inputted into the write head element for example of the thin-film magnetic head element through the trace conductors 106c and 106d, or the measurement probes are contacted to these four test connection pads 111a–111d for measuring all of these signals, and thus electrical characteristics of the thin-film head element is obtained (step S25). If it is judged that the HGA measured is a defective from thus obtained electrical characteristics, the magnetic head slider may be re-mounted or adjusted, or the HGA may be discarded.

Thereafter, the gold balls or the solders are removed to break the short-circuiting between the test connection pads 111a–111d and the trace conductors 106a–106d, and thus the HGA is brought to completion (step S26).

The flexure, load beam and base plate of the suspension 100 is not limited to the aforementioned structure but various modifications can be adopted as a matter of course.

As will be noted according to this embodiment, the test connection pads 111a–111d are electrically shorted to the trace conductors 106a–106d and the measurement probes are contacted to the test connection pads only when the electrical characteristics is measured, and the short-circuits are broken after the measurement. Therefore, electrical characteristics of the thin-film magnetic head element can be easily measured using these test connection pads 111a–111d without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, all of the test connection pads 111a–111d are temporally short-circuited to the trace conductors 106a–106d. However, in modifications, only necessary test connection pads may be temporally short-circuited to the second trace conductors.

Figure 14:
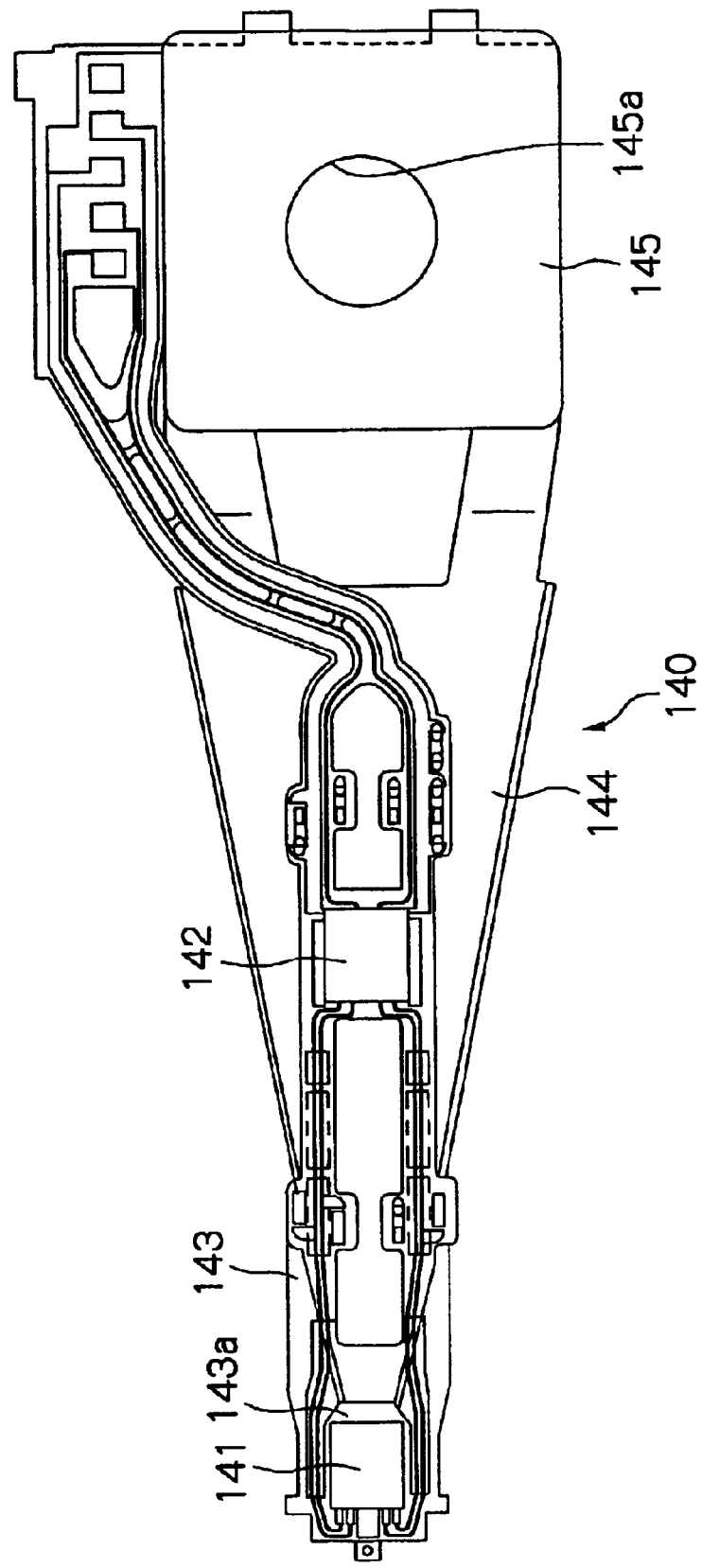
FIG. 14 is a plane view illustrating a structure of an HGA as a further embodiment according to the present invention.
Figure 15:
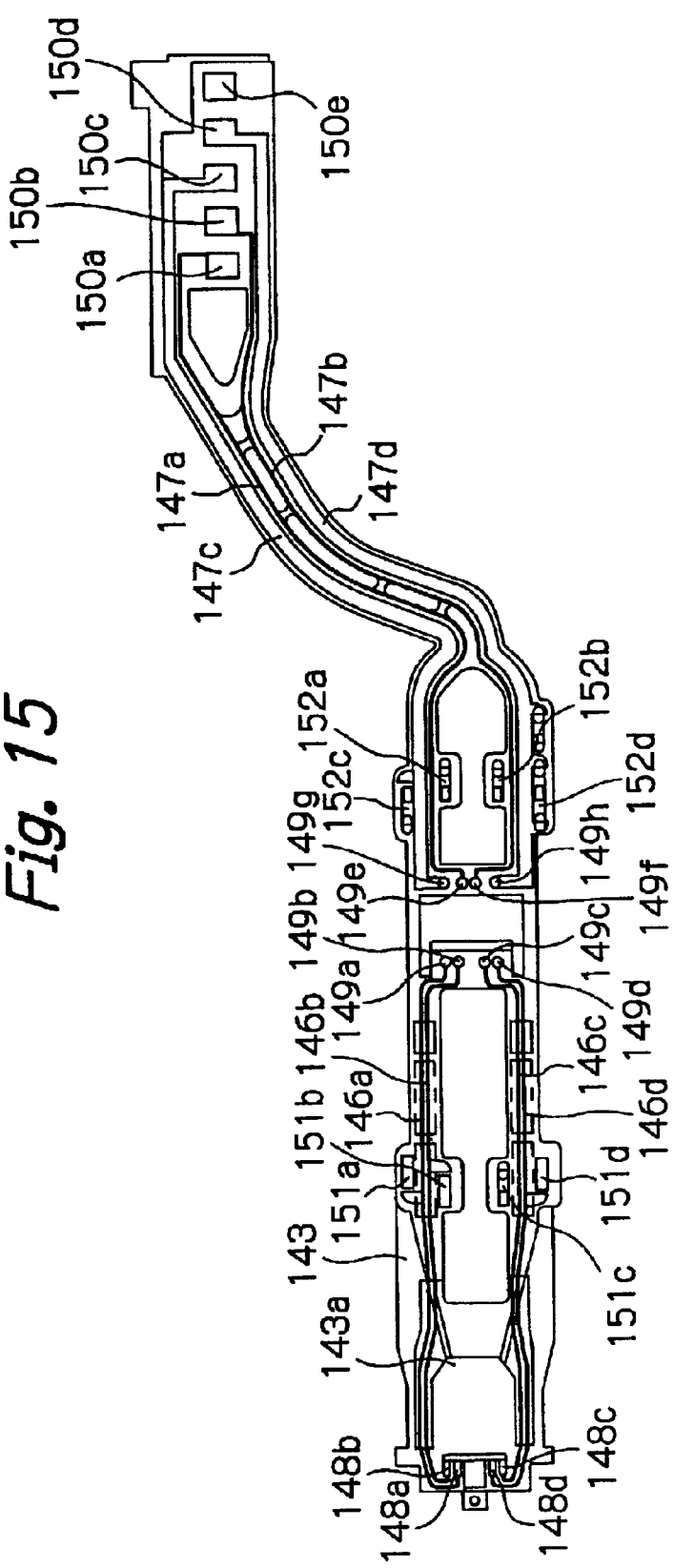
FIG. 15 is a plane view illustrating a structure of a flexure and a lead conductor member formed thereon of the HGA shown in FIG. 14.

FIG. 14 illustrates a structure of an HGA as a further embodiment according to the present invention, and FIG. 15 illustrates a structure of a flexure and a lead conductor member formed thereon of the HGA shown in FIG. 14.

As shown in FIG. 14, the HGA is assembled by fixing a magnetic head slider 141 having at least one thin-film magnetic head element to a top end section of a suspension 140 and by mounting a drive IC chip 142 for driving the head element and for amplifying a read-out signal from the head element on a middle section of this suspension 140.

The suspension 140 is substantially constituted by a resilient metal flexure 143 which carries the slider 141 at its one end section, a resilient metal load beam 144 that supports and fixes the flexure 143, a metal base plate 145 fixed to a base end section of the load beam 144.

The magnetic head slider 141 has the at least one thin-film magnetic head element consisting of a write head element and an MR read head element. Although it is a mere example, the size of the magnetic head slider 11 is 1.25 mm×1.0 mm×0.3 mm.

The flexure 413 has a flexible tongue 143a depressed by a dimple (not shown) formed on the load beam 144 and has elasticity for flexibly supporting by the tongue 143a the magnetic head slider 141 to provide a stable attitude to the slider. The flexure 143 is made of in this embodiment a stainless steel plate (for example SUS304TA) with a thickness of about 25 $\mu$m and a substantially constant width.

A lead conductor member of a thin film conductive pattern is formed on the flexure 143 along its whole length. This lead conductor member has four first trace conductors 146a–146d and four second trace conductors 147a–147d.

One ends of the first trace conductors 146a–146d are connected to four head connection pads 148a–148d formed at one end section (top end section) of the flexure 143. These head connection pads 148a–148d are electrically connected to four terminal electrodes of the magnetic head slider 141. The other ends of the first trace conductors 146a–146d are connected to four pads 149a–149d of eight IC chip connection pads 149a–149h formed on the middle section of the flexure 143 and electrically connected to eight terminal electrodes of the IC chip 142.

One ends of the second trace conductors 147a–147d are connected to the IC chip connection pads 149e–149h. The other ends of the second trace conductors 147a–147d are connected to four pads 150a–150d of five external connection pads 150a–150e formed on the other end section (rear end section) of the flexure 143. The remaining pad 150e is in this embodiment a dummy pad. To the external connection pads 150a–150e, in fact, a link FPC not shown will be connected. In this embodiment, one pair of the second trace conductors 147a and 147b are signal and control lines and the other pair of the second trace conductors 147c and 147d are power supply lines.

The lead conductor member in this embodiment further has four first test connection pads 151a–151d capable of temporally shorting with the first trace conductors 146a–146d, and four second test connection pads 152a–152d capable of temporally shorting with the second trace conductors 147a–147d, respectively. The first test connection pads 151a–151d are arranged at a position near to the magnetic head slider 141, and the second test connection pads 152a–152d are arranged at a position near to the IC chip 142.

As well as that shown in FIG. 5, a thin film pattern of the lead conductor member is formed by sequentially depositing a polyimide layer with a thickness of about 10 μm (lower insulation layer), a patterned Cu layer with a thickness of about 10 μm (first and second trace conductors 146a–146d and 147a–147d, head connection pads 148a–148d, IC chip connection pads 149e–149h, external connection pads 150a–150e or first and second test connection pads 151a–151d and 152a–152d), and a polyimide layer 52 with a thickness of about 3 μm (upper insulation layer) directly on the flexure 143 in this order. In a modification, a preliminarily deposited multi-layered film of the conductive pattern may be laminated on the flexure 143.

Within inner regions of the head connection pads 148a–148d, IC chip connection pads 149e–149h and external connection pads 150a–150e, a Ni layer and an Au layer are sequentially deposited on the Cu layer and there is no upper insulation layer. Similar to this, within regions of the first and second test connection pads 151a–151d and 152a–152d, to which the measurement probes will be contact, within regions of the first and second test connection pads 151a–151d and 152a–152d, to which the first and second trace conductors 146a–146d and 147a–147d will be temporally connected, and within regions of the first and second trace conductors 146a–146d and 147a–147d, to which the first and second test connection pads 151a–151d and 152a–152d will be temporally connected, a Ni layer and an Au layer are sequentially deposited on the Cu layer and there is no upper insulation layer.

The load beam 144 has elasticity for depressing the magnetic head slider 141 toward the direction of a magnetic disk in operation so as to provide a stable flying height. This load beam 144 is made of in this embodiment a resilient stainless steel plate with a thickness of about 60–65 μm and supports the flexure 143 along its whole length. The load beam 144 has a shape with a width that narrows with approaching to its top end. Fixing of the flexure 143 to the load beam 144 is performed by spot welding at a plurality of points using a laser beam for example. As will be noted, in this embodiment, the suspension has a three-pieces structure constituted by individual components of the flexure 143, the load beam 144 and the base plate 145. In such three-pieces structure, stiffness of the flexure 143 is set to be lower than that of the load beam 144.

The base plate 145 is made of a stainless steel plate or an iron plate with a thickness larger than that of the load beam 144, and is fixed to the base end section of the load beam 144 by spot welding using a laser beam for example. The HGA will be attached to each support arm (not shown) by mechanically swaging an attachment part 145a of the base plate 145 to the support arm.

As well as these shown in FIGS. 3 and 12, the first and second test connection pads 151a–151d and 152a–152d are arranged to have spaces with the respective first and second trace conductors 146a–146d and 147a–147d, so as to be temporally short-circuited with the first and second trace conductors 146a–146d and 147a–147d when required. This temporal short-circuit may be established by a ball-bonding using a gold ball, or shorting using a connection pin.

Each of the first and second test connection pads 151a–151d and 152a–152d has a size for permitting easy contact of the measurement probe. Although each test connection pad has a substantially rectangular shape in this embodiment, any shape such as another polygonal shape, an ellipse shape or a circular shape may be adopted.

It is desired that the first test connection pads 151a–151d are arranged at a position as nearer as the magnetic head slider 141 because the measured values of the current supplied to the write head element and reproduction signal from the read head element are unaffected by the trace conductors. However, if these first test connection pads 151a–151d are arranged at a position as nearer as the IC chip 142, it is possible to measure an actual value of the reproduction signal applied to the IC chip 142. Thus, it is most desired that these first test connection pads 151a–151d are arranged at both positions. Whereas it is desired that the second test connection pads 152a–152d are arranged at a position as nearer as the IC chip 142 because the measured values are unaffected by the trace conductors. However, if it is difficult to locate them at these positions due to no space, any optional position may be selected to form the first and second test connection pads.

Figure 16:
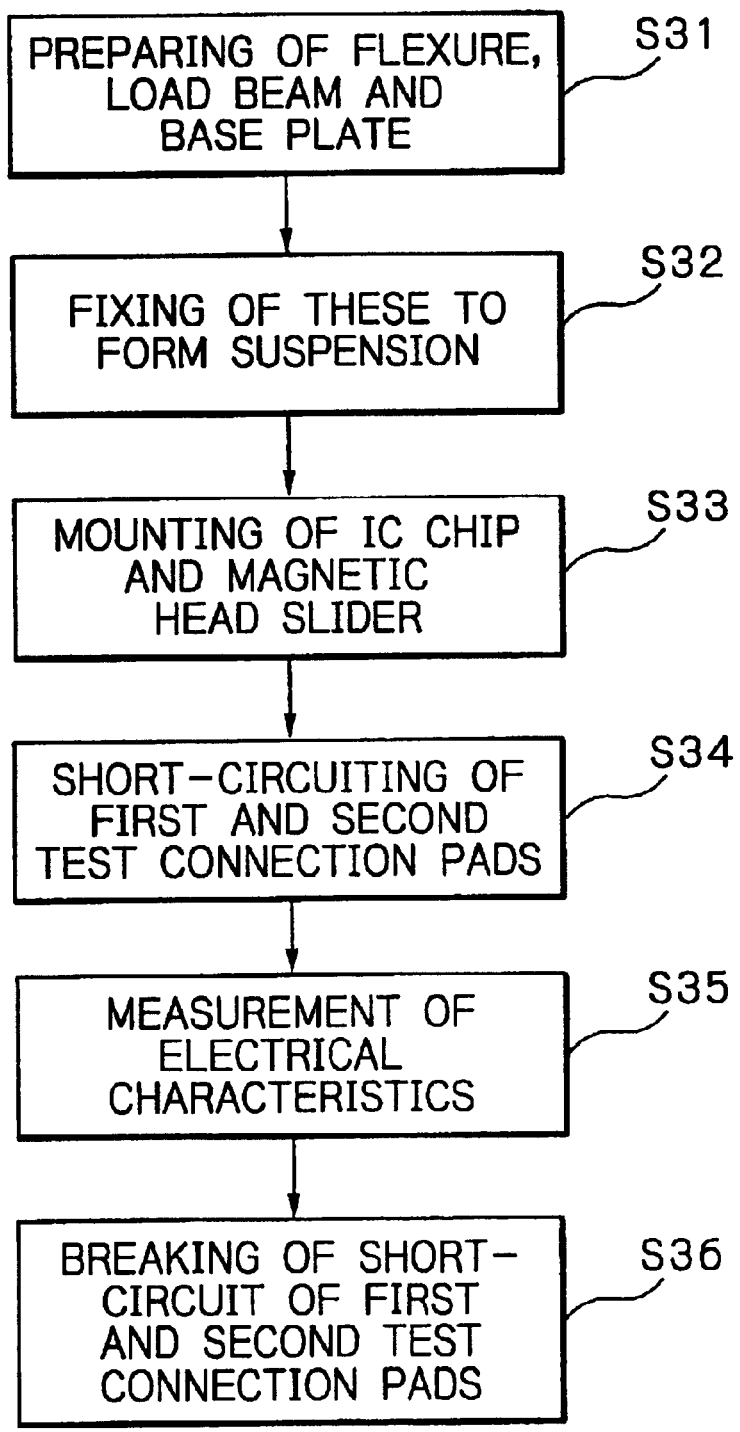
FIG. 16 is a flow chart illustrating a part of fabrication process of a manufacturing method of an HGA in the embodiment of FIG. 14.

FIG. 16 illustrates a part of fabrication process of a manufacturing method of an HGA in the embodiment of FIG. 14. Hereinafter, the manufacturing process will be described in detail with reference to this figure.

First, a flexure 143 with a lead conductor member laminated thereon, a load beam 144 and a base plate 145 are prepared (step S31).

Then, a suspension 140 is fabricated by fixing the flexure 143, the load beam 144 and the base plate 145 with each other by means of spot welding using a laser beam (step S32).

Then, an IC chip 142 and a magnetic head slider 141 are mounted on the suspension 140 (step S33). The mounting of the IC chip 142 is performed by electrically bonding its electrode terminals to IC chip connection pads 149a–149h of the lead conductor member formed on the flexure 143 by means of a flip-chip bonding using solder or gold bumps, and then by filling an underfill material into a space between the lead conductor member and the IC chip 142 if necessary. The mounting of the magnetic d head slider 141 is performed by adhering the slider 141 to a tongue 143a of the flexure 143, and by electrically connecting its electrode terminals to head element connection pads 148a–148d by means of soldering or ball-bonding.

Then, first test connection pads 151a–151d and first trace conductors 146a–146d and second test connection pads 152a–152d and second trace conductors 147a–147d are electrically short-circuited, respectively (step S34). These short-circuits may be achieved by gold-ball bonding or by using connection pins.

Then, measurement probes of a measuring instrument are contacted to the second test connection pads 152a and 152b for measuring signals inputted into or outputted from the IC chip 142 through the second trace conductors 147a and 147b, the measurement probes are contacted to the second test connection pads 152c and 152d for measuring power voltage supplied to the IC chip 142 through the second trace conductors 147c and 147d, or the measurement probes are contacted to these four test connection pads 152a–152d for measuring all of these signals and power voltages, and thus electrical characteristics of the IC chip 142 is obtained. Also, the measurement probes are contacted to the first test connection pads 151a and 151b for measuring signals inputted into or outputted from the MR read head element for example of the thin-film magnetic head element through the first trace conductors 146a and 146b, the measurement probes are contacted to the first test connection pads 151c and 151d for measuring signal inputted into the write head element for example of the thin-film magnetic head element through the first trace conductors 146c and 146d, or the measurement probes are contacted to these four test connection pads 151a–151d for measuring all of these signals, and thus electrical characteristics of the thin-film head element is obtained (step S35). If it is judged that the HGA measured is a defective from thus obtained electrical characteristics, the IC chip or the magnetic head slider may be re-mounted or adjusted, or the HGA may be discarded.

Thereafter, the gold balls or the solders are removed to break the short-circuiting between the first test connection pads 151a–151d and the first trace conductors 146a–146d and the short-circuiting between the second test connection pads 152a–152d and the second trace conductors 147a–147d, and thus the HGA is brought to completion (step S36).

The flexure, load beam and base plate of the suspension 140 is not limited to the aforementioned structure but various modifications can be adopted as a matter of course.

As will be noted according to this embodiment, the first and second test connection pads 151a–151d and 152a–152d are electrically shorted to the respective first and second trace conductors 146a–146d and 147a–147d and the measurement probes are contacted to the first and second test connection pads only when the electrical characteristics is measured, and the short-circuits are broken after the measurement. Therefore, electrical characteristics of the IC chip and the thin-film magnetic head element can be easily measured using these first and second test connection pads 151a–151d and 152a–152d without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, all of the first and second test connection pads 151a–151d and 152a–152d are temporally short-circuited to the first and second trace conductors 146a–146d and 147a–147d, respectively. However, in modifications, only necessary test connection pads may be temporally short-circuited to the second trace conductors. Also, in this embodiment, both the first and second test connection pads 151a–151d and 152a–152d are simultaneously used for the measurements of electrical characteristics. However, in modifications, these first and second test connection pads 151a–151d and 152a–152d may be individually used for the measurements.

Furthermore, in this embodiment, the lead conductor member has four second trace conductors, namely two signal and control lines and two power supply lines. However, in modifications, five second trace conductors including an individual control line separated from two signal lines may be provided.

Figure 17:
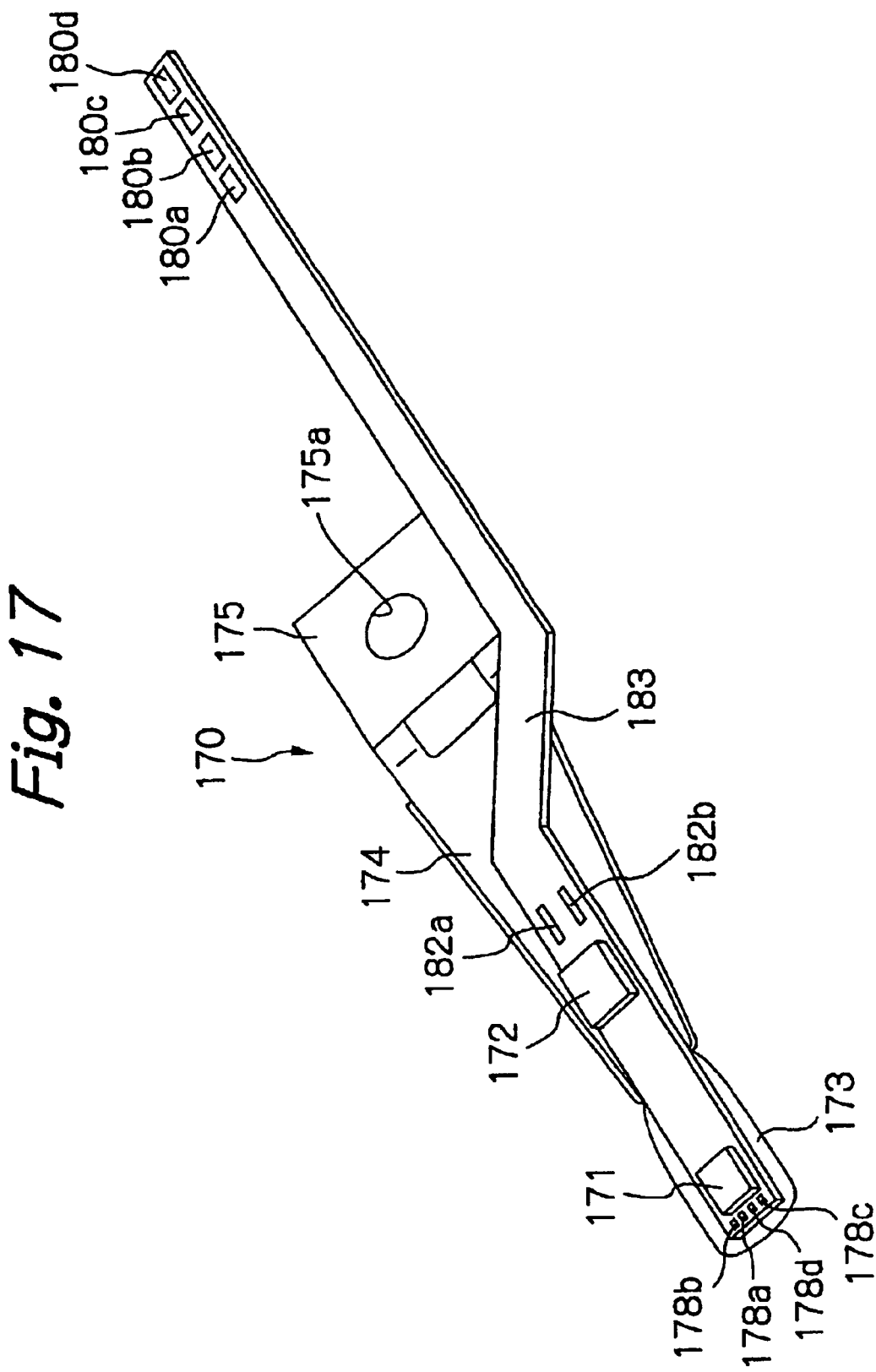
FIG. 17 is an oblique view illustrating a structure of an HGA as a still further embodiment according to the present invention.
Figure 18:
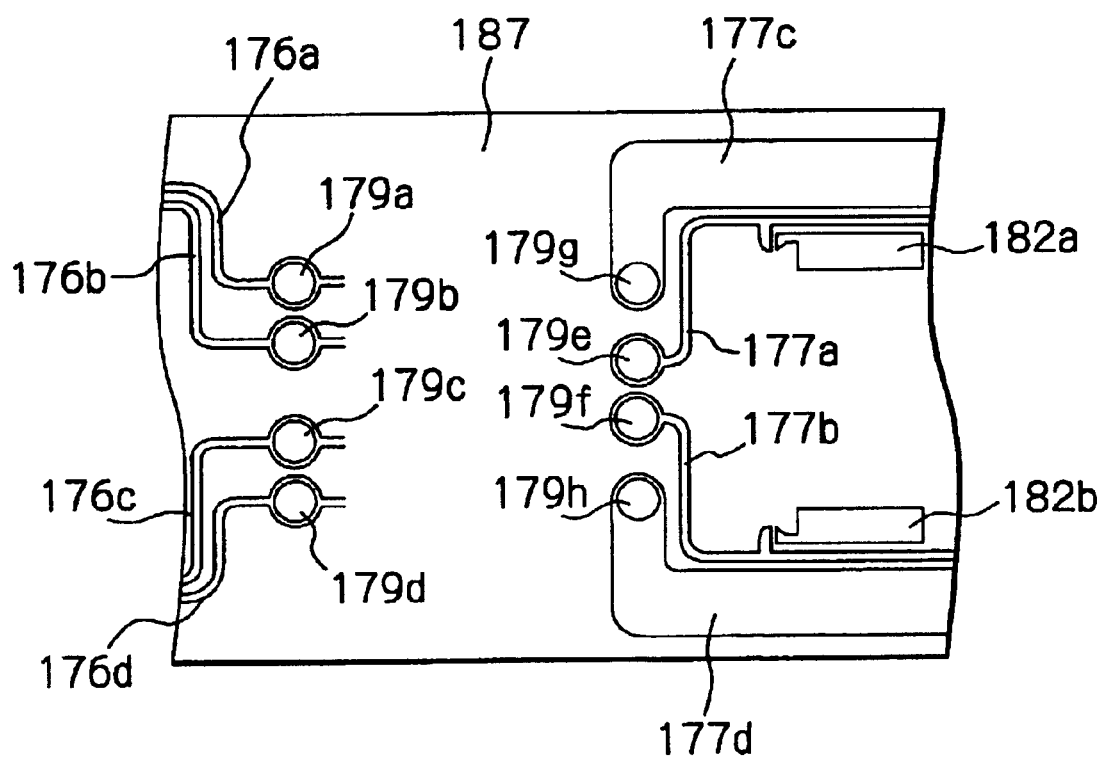
FIG. 18 is an enlarged plane view illustrating a structure of test connection pads shown in FIG. 17.

FIG. 17 illustrates a structure of an HGA as a still further embodiment according to the present invention, and FIG. 18 illustrates an enlarged structure of test connection pads shown in FIG. 17. In this embodiment, a FPC member is utilized as a lead conductor member.

As shown in FIG. 17, the HGA is assembled by fixing a FPC 183 on a suspension 170. On the FPC 183, a magnetic head slider 171 having at least one thin-film magnetic head element is preliminarily mounted at its top end section and also a drive IC chip 172 for driving the head element and for amplifying a read-out signal from the head element is preliminarily mounted on its middle section.

The suspension 170 is substantially constituted by a resilient metal flexure 173, a resilient metal load beam 174 that supports and fixes the flexure 173 at its top end section, a metal base plate 175 fixed to a base end section of the load beam 174.

The magnetic head slider 171 has the at least one thin-film magnetic head element consisting of a write head element and an MR read head element. Although it is a mere example, the size of the magnetic head slider 171 is 1.25 mm×1.0 mm×0.3 mm.

The flexure 173 has a flexible tongue (not shown) depressed by a dimple (not shown) formed on the load beam 174 and has elasticity for flexibly supporting by the tongue the magnetic head slider 171 to provide a stable attitude to the slider. The flexure 173 is made of in this embodiment a stainless steel plate (for example SUS304TA) with a thickness of about 25 $\mu$m and a substantially constant width.

The load beam 174 has elasticity for depressing the magnetic head slider 171 toward the direction of a magnetic disk in operation so as to provide a stable flying height. This load beam 174 is made of in this embodiment a resilient stainless steel plate with a thickness of about 60–65 $\mu$m and supports the flexure 173 at its top end section. The load beam 174 has a shape with a width that narrows with approaching to its top end. Fixing of the flexure 173 to the load beam 174 is performed by spot welding at a plurality of points using a laser beam for example. As will be noted, in this embodiment, the suspension has a three-pieces structure constituted by individual components of the flexure 173, the load beam 174 and the base plate 175. In such three-pieces structure, stiffness of the flexure 173 is set to be lower than that of the load beam 174.

The base plate 175 is made of a stainless steel plate or an iron plate with a thickness larger than that of the load beam 174, and is fixed to the base end section of the load beam 174 by spot welding using a laser beam for example. The HGA will be attached to each support arm (not shown) by mechanically swaging an attachment part 175a of the base plate 175 to the support arm.

The FPC 183 is tightly fixed to the load beam 174 and the flexure 173 by an adhesive. Parts of the FPC 183, located in a slanting frontward direction of the base plate 175 and located in a backward direction of the base plate 175 are floating in a space.

The FPC 183 has, although it is not shown in FIG. 17, four first trace conductors 176a–176d and four second trace conductors 177a–177d.

One ends of the first trace conductors 176a–176d are connected to four head connection pads 178a–178d formed at one end section (top end section) of the FPC 183. These head connection pads 178a–178d are electrically connected to four terminal electrodes of the magnetic head slider 171. The other ends of the first trace conductors 176a–176d are connected to four pads 179a–179d of eight IC chip connection pads 179a–179h formed on the middle section of the FPC 183 and electrically connected to eight terminal electrodes of the IC chip 172.

One ends of the second trace conductors 177a–177d are connected to the IC chip connection pads 179e–179h. The other ends of the second trace conductors 177a–177d are connected to four external connection pads 180a–180d formed on the other end section (rear end section) of the FPC 183. In this embodiment, one pair of the second trace conductors 177a and 177b are signal and control lines and the other pair of the second trace conductors 177c and 177d are power supply lines.

As apparently shown in FIG. 18, the FPC 183 in this embodiment further has two test connection pads 182a and 182b capable of temporally shorting with the second trace conductors 177a and 177b, respectively. These test connection pads 182a and 182b are arranged at a position near to the IC chip 172.

The FPC 183 is formed by sequentially laminating a thin resin layer made of for example polyimide (base film layer), a patterned lead conductor layer made of for example Cu and a cover layer made of for example polyimide (over coat layer). The base film layer is tightly fixed to the load beam 174 by an adhesive such as for example a UV resin adhesive or an epoxy resin adhesive.

Within inner regions of the head connection pads 178a–178d, IC chip connection pads 179e–179h and external connection pads 180a–180e, a Ni layer and an Au layer are sequentially deposited on the Cu layer and there is no over coat layer. Similar to this, within regions of the test connection pads 182a and 182b, to which the measurement probes will be contact, within regions of the test connection pads 182a and 182b, to which the second trace conductors 177a and 177b will be temporally connected, and within regions of the second trace conductors 177a and 177b, to which the test connection pads 182a and 182b will be temporally connected, an Ni layer and an Au layer are sequentially deposited on the Cu layer and there is no over coat layer.

As shown in FIG. 18, the test connection pads 182a and 182b are arranged to have spaces with the respective second trace conductors 177a and 177b, so as to be temporally short-circuited with the second trace conductors 177a and 177b when required. This temporal short-circuit may be established by a ball-bonding using a gold ball, or shorting using a connection pin.

Each of the test connection pads 182a and 182b has a size for permitting easy contact of the measurement probe. Although each test connection pad has a substantially rectangular shape in this embodiment, any shape such as another polygonal shape, an ellipse shape or a circular shape may be adopted.

It is desired that the test connection pads 182a and 182b are arranged at a position as nearer as the IC chip 172 because the measured values are unaffected by the trace conductors. However, if it is difficult to locate them near the IC chip 172 due to no space, any optional position may be selected to form the test connection pads.

Figure 19:
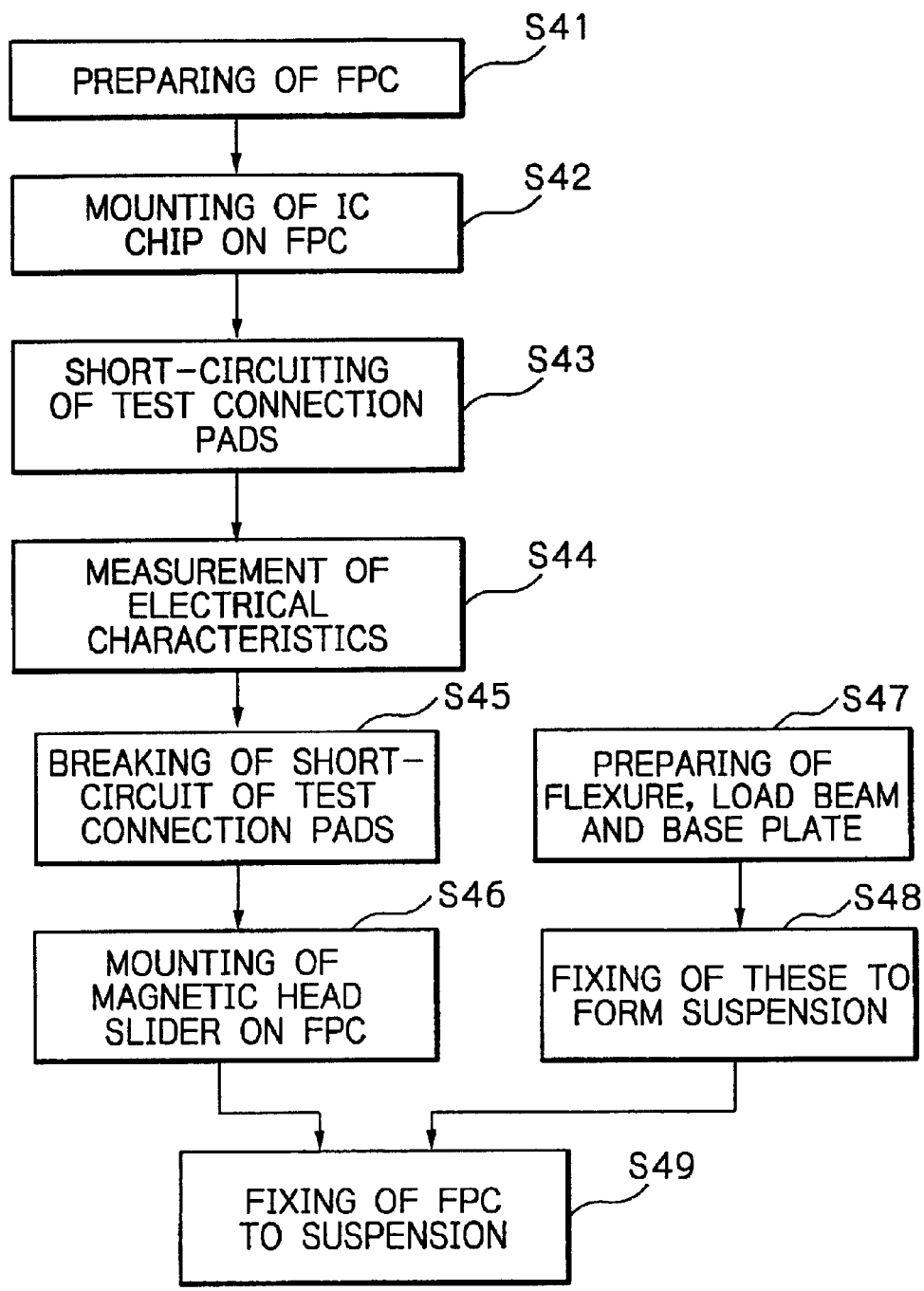
FIG. 19 is a flow chart illustrating a part of fabrication process of a manufacturing method of an HGA in the embodiment of FIG. 17.

FIG. 19 illustrates a part of fabrication process of a manufacturing method of an HGA in the embodiment of FIG. 17. Hereinafter, the manufacturing process will be described in detail with reference to this figure.

Figure 20:
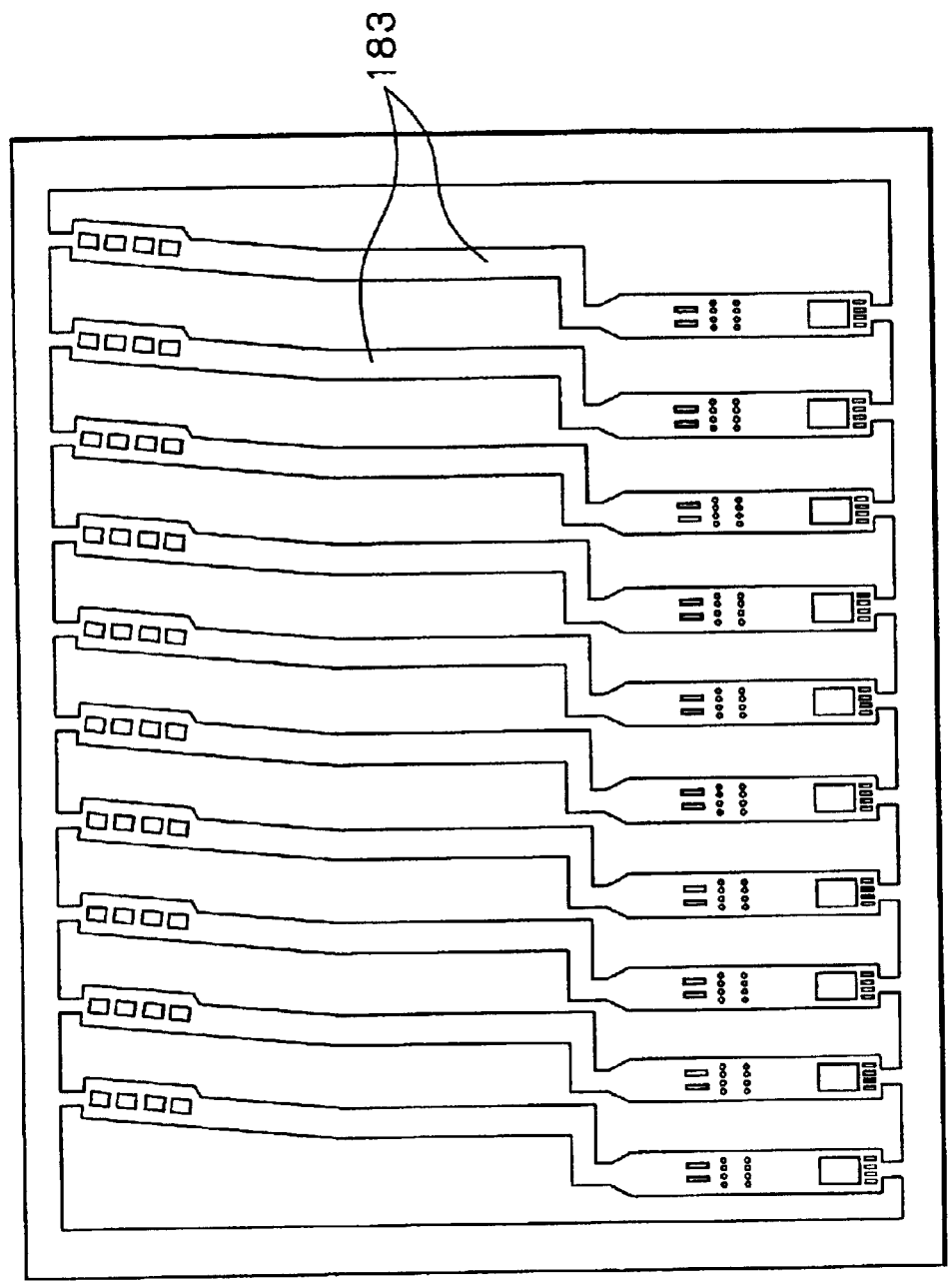
FIG. 20 is a plane view illustrating a plurality of FPCs coupled with a frame in the embodiment of FIG. 17.

First, a FPC 183 with trace conductors and connection pads formed as aforementioned is prepared (step S41). FIG. 20 shows a plurality of the FPCs 183 coupled with a frame.

Figure 21:
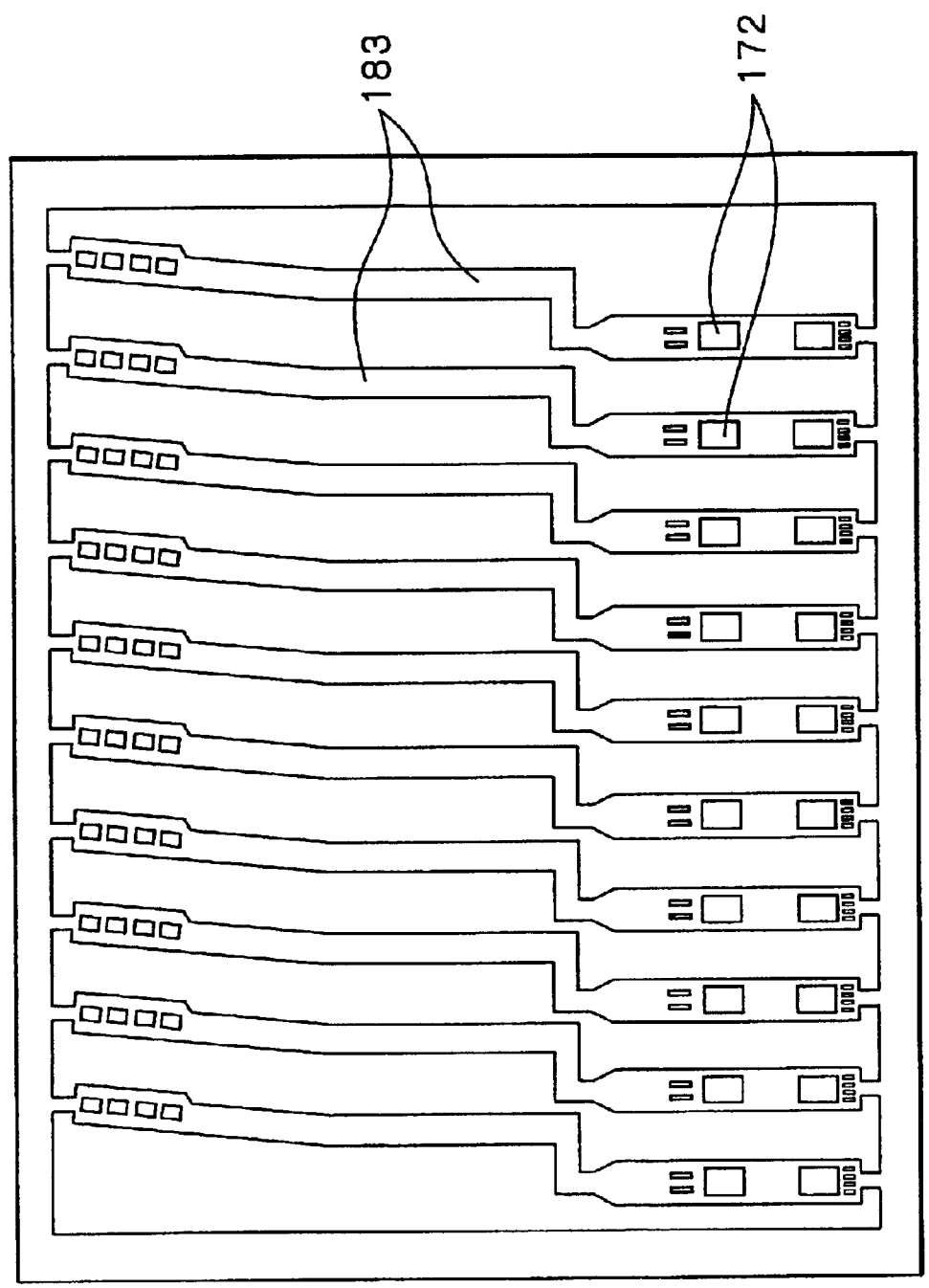
FIG. 21 is a plane view illustrating a plurality of FPCs coupled with a frame and provided with mounted IC chips in the embodiment of FIG. 17.

Then, an IC chip 172 is mounted on each FPC 183 coupled with the frame or separated from the frame (step S42). The mounting of the IC chip 172 is performed by electrically bonding its electrode terminals to IC chip connection pads 179a–179h of the FPC 183 by means of a flip-chip bonding using solder or gold bumps, and then by filling an underfill material into a space between the FPC 183 and the IC chip 172 if necessary. FIG. 21 shows the plurality of the FPCs 183 provided with the mounted IC chips 172 and coupled with the frame.

Then, test connection pads 182a and 182b and second trace conductors 177a and 177b are electrically short-circuited, respectively (step S43). These short-circuits may be achieved by gold-ball bonding or by using connection pins.

Then, measurement probes of a measuring instrument are contacted to the test connection pads 182a and 182b for measuring signals inputted into or outputted from the IC chip 172 through the second trace conductors 177a and 177b, and thus electrical characteristics of the IC chip 172 is obtained (step S44). If it is judged that the FPC with the IC chip measured is a defective from thus obtained electrical characteristics, the IC chip may be re-mounted or adjusted, or the FPC with the IC chip may be discarded.

Thereafter, the gold balls or the solders are removed to break the short-circuiting between the test connection pads 182a and 182b and the second trace conductors 177a and 177b (step S45).

Then, a magnetic head slider 171 is mounted on the FPC 183 (step S46). The mounting of the magnetic head slider 171 is performed by electrically connecting electrode terminals of the slider 171 to head element connection pads 178a–178d formed on the FPC 183 by means of soldering or ball-bonding.

On the other hands, a flexure 173, a load beam 174 and a base plate 175 are prepared (step S47).

Then, a suspension 170 is fabricated by fixing the flexure 173, the load beam 174 and the base plate 175 with each other by means of spot welding using a laser beam (step S48).

Thereafter, the FPC 183 with the IC chip 172 and the magnetic head slider 171 mounted thereon is adhered and fixed to the suspension 170, and thus the HGA is brought to completion (step S49).

Electrical characteristics of the thin-film magnetic head element will be thereafter measured by means of a read/write tester for example in this embodiment.

The flexure, load beam and base plate of the suspension 170 is not limited to the aforementioned structure but various modifications can be adopted as a matter of course.

As will be noted according to this embodiment, the test connection pads 182a and 182b are electrically shorted to the second trace conductors 177a and 177b and the measurement probes are contacted to the test connection pads only when the electrical characteristics is measured, and the short-circuits are broken after the measurement. Therefore, electrical characteristics of the IC chip can be easily measured using these test connection pads 182a and 182b without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, only the test connection pads 182a and 182b capable of temporally short-circuiting to the second trace conductors 177a and 177b are formed. However, in modifications, test connection pads capable of temporally short-circuiting to the second trace conductors 177c and 177d may be formed.

Also, in this embodiment, the FPC has four second trace conductors, namely two signal and control lines and two power supply lines. However, in modifications, five second trace conductors including an individual control line separated from two signal lines may be provided.

Figure 22:
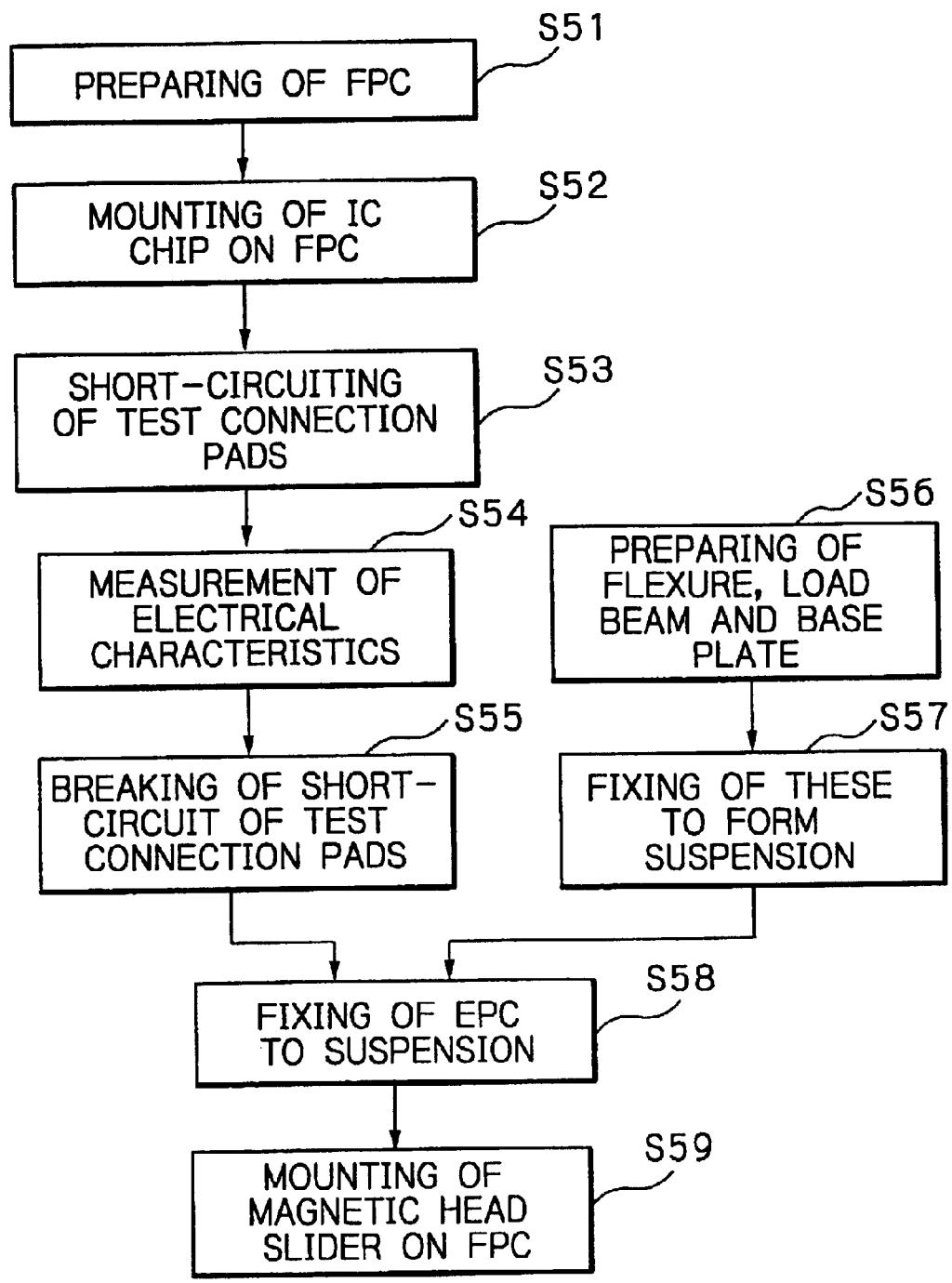
FIG. 22 is a flow chart illustrating a part of fabrication process in a modification of the manufacturing method of FIG. 19.

FIG. 22 illustrates a part of fabrication process in a modification of the manufacturing method of FIG. 19. Hereinafter, the modification in the manufacturing process will be described in detail with reference to this figure.

First, a FPC 183 with trace conductors and connection pads formed as aforementioned is prepared (step S51).

Then, an IC chip 172 is mounted on each FPC 183 (step S52). The mounting of the IC chip 172 is performed by electrically bonding its electrode terminals to IC chip connection pads 179a–179h of the FPC 183 by means of a flip-chip bonding using solder or gold bumps, and then by filling an underfill material into a space between the FPC 183 and the IC chip 172 if necessary.

Then, test connection pads 182a and 182b and second trace conductors 177a and 177b are electrically short-circuited, respectively (step S53). These short-circuits may be achieved by gold-ball bonding or by using connection pins.

Then, measurement probes of a measuring instrument are contacted to the test connection pads 182a and 182b for measuring signals inputted into or outputted from the IC chip 172 through the second trace conductors 177a and 177b, and thus electrical characteristics of the IC chip 172 is obtained (step S54). If it is judged that the FPC with the IC chip measured is a defective from thus obtained electrical characteristics, the IC chip may be re-mounted or adjusted, or the FPC with the IC chip may be discarded.

Thereafter, the gold balls or the solders are removed to break the short-circuiting between the test connection pads 182a and 182b and the second trace conductors 177a and 177b (step S55).

On the other hands, a flexure 173, a load beam 174 and a base plate 175 are prepared (step S56).

Then, a suspension 170 is fabricated by fixing the flexure 173, the load beam 174 and the base plate 175 with each other by means of spot welding using a laser beam (step S57).

Then, the FPC 183 with the IC chip 172 mounted thereon is adhered and fixed to the suspension 170 (step S58).

Thereafter, a magnetic head slider 171 is mounted on the FPC 183, and thus the HGA is brought to completion (step S59). The mounting of the magnetic head slider 171 is performed by electrically connecting electrode terminals of the slider 171 to head element connection pads 178a–178d formed on the FPC 183 by means of soldering or ball-bonding.

Electrical characteristics of the thin-film magnetic head element will be thereafter measured by means of a read/write tester for example in this embodiment.

The other configurations, operations and advantages in this modification are substantially the same as those in the embodiment of FIG. 17.

Figure 23:
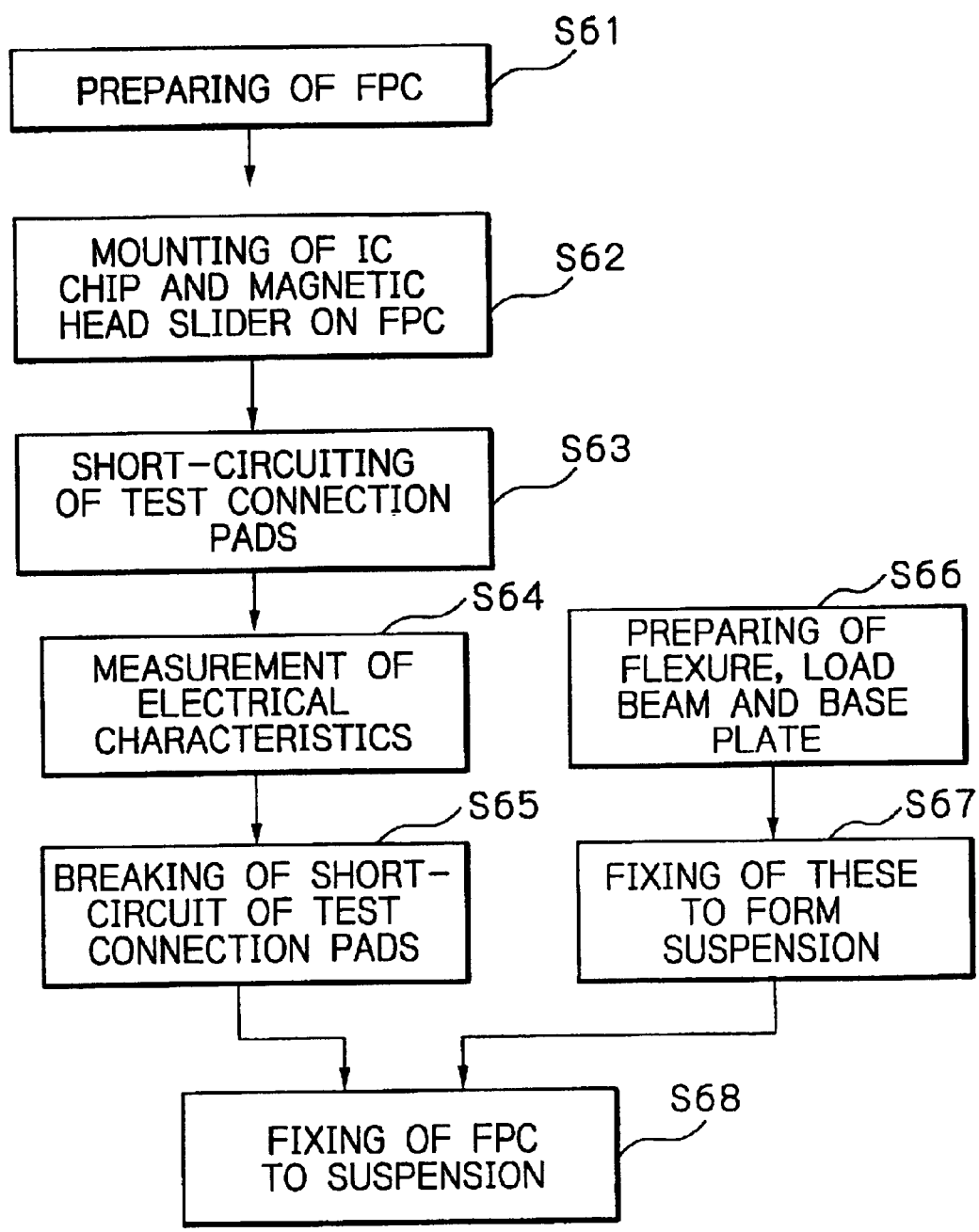
FIG. 23 is a flow chart illustrating a part of fabrication process in another modification of the manufacturing method of FIG. 19.

FIG. 23 illustrates a part of fabrication process in another modification of the manufacturing method of FIG. 19. Hereinafter, the modification in the manufacturing process will be described in detail with reference to this figure.

First, a FPC 183 with trace conductors and connection pads formed as aforementioned is prepared (step S61).

Then, an IC chip 172 and a magnetic head slider 171 are mounted on each FPC 183 (step S62). The mounting of the IC chip 172 is performed by electrically bonding its electrode terminals to IC chip connection pads 179a–179h of the FPC 183 by means of a flip-chip bonding using solder or gold bumps, and then by filling an underfill material into a space between the FPC 183 and the IC chip 172 if necessary. The mounting of the magnetic head slider 171 is performed by electrically connecting electrode terminals of the slider 171 to head element connection pads 178a–178d formed on the FPC 183 by means of soldering or ball-bonding.

Then, test connection pads 182a and 182b and second trace conductors 177a and 177b are electrically short-circuited, respectively (step S63). These short-circuits may be achieved by gold-ball bonding or by using connection pins.

Then, measurement probes of a measuring instrument are contacted to the test connection pads 182a and 182b for measuring signals inputted into or outputted from the IC chip 172 through the second trace conductors 177a and 177b, and thus electrical characteristics of the IC chip 172 is obtained (step S64). If it is judged that the FPC with the IC chip and the magnetic head slider measured is a defective from thus obtained electrical characteristics, the IC chip may be remounted or adjusted, or the FPC with the IC chip and the magnetic head slider may be discarded.

Thereafter, the gold balls or the solders are removed to break the short-circuiting between the test connection pads 182a and 182b and the second trace conductors 177a and 177b (step S65).

On the other hands, a flexure 173, a load beam 174 and a base plate 175 are prepared (step S66).

Then, a suspension 170 is fabricated by fixing the flexure 173, the load beam 174 and the base plate 175 with each other by means of spot welding using a laser beam (step S67).

Then, the FPC 183 with the IC chip 172 and the magnetic head slider 171 mounted thereon is adhered and fixed to the suspension 170, and thus the HGA is brought to completion (step S68).

Electrical characteristics of the thin-film magnetic head element will be thereafter measured by means of a read/write tester for example in this embodiment.

The other configurations, operations and advantages in this modification are substantially the same as those in the embodiment of FIG. 17.

Figure 24:
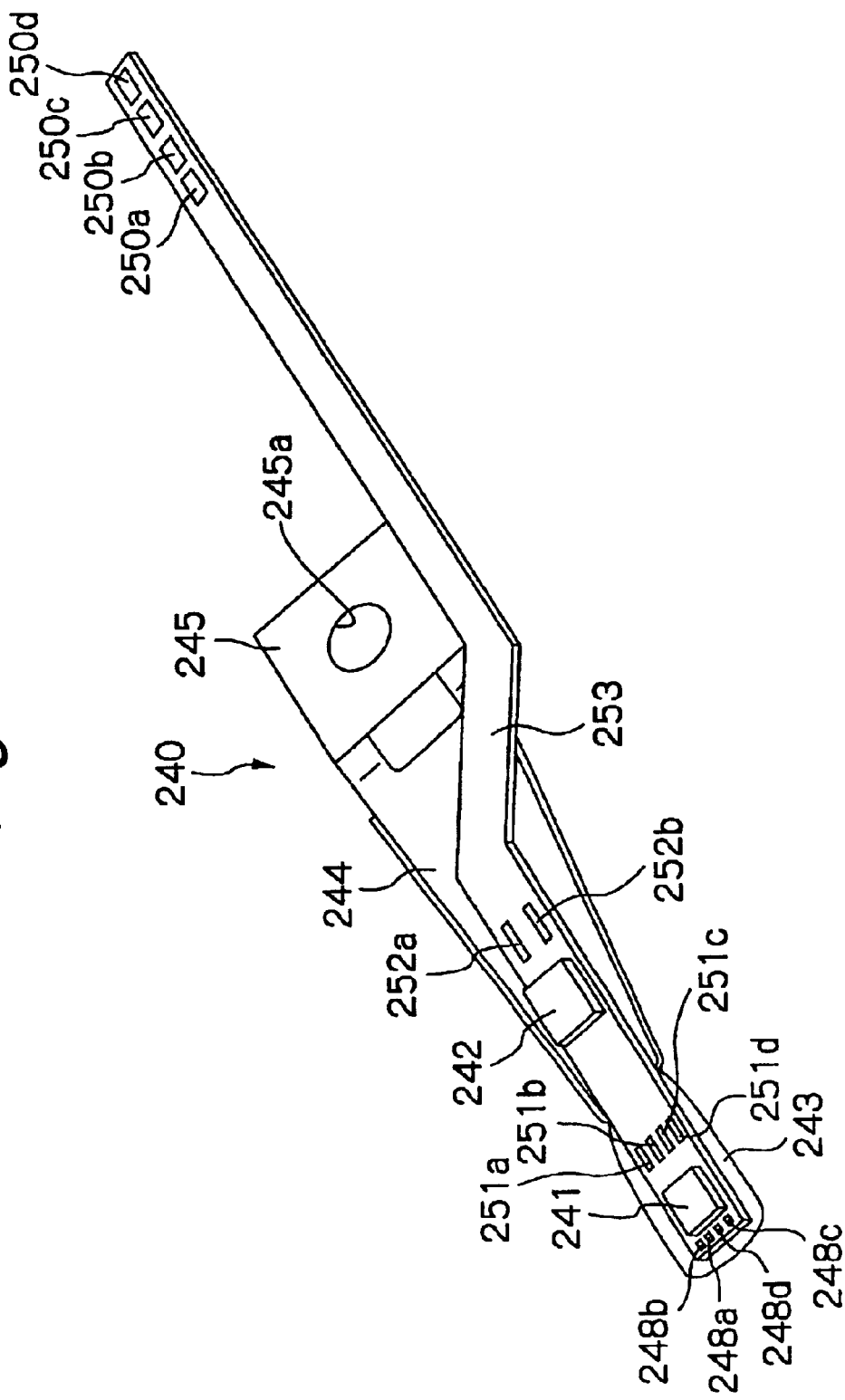
FIG. 24 is an oblique view illustrating a structure of an HGA as a further embodiment according to the present invention.
Figure 25:
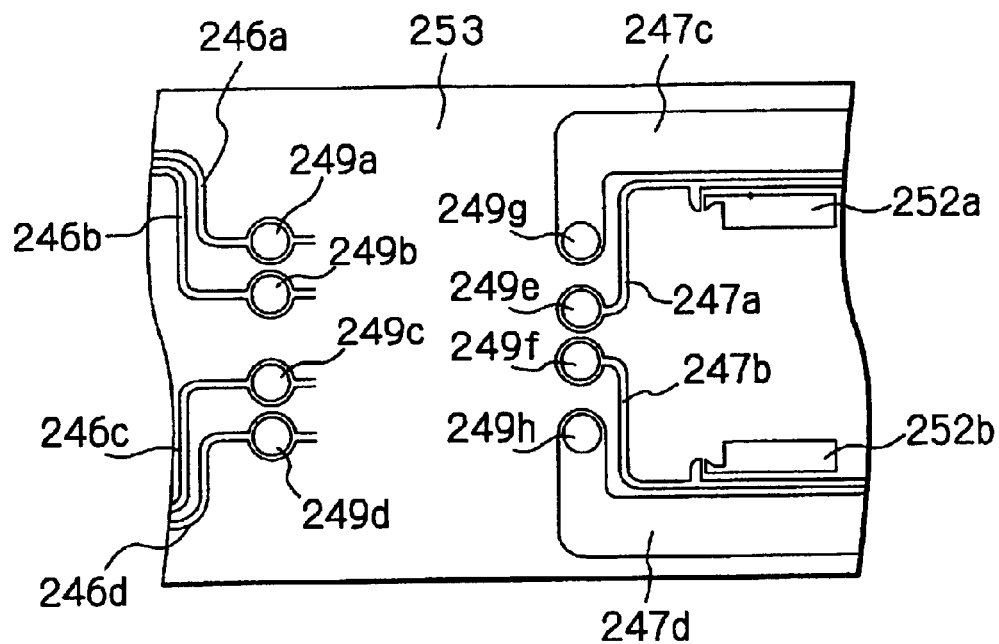
FIG. 25 is an enlarged plane view illustrating a structure of test connection pads shown in FIG. 24.
Figure 26:
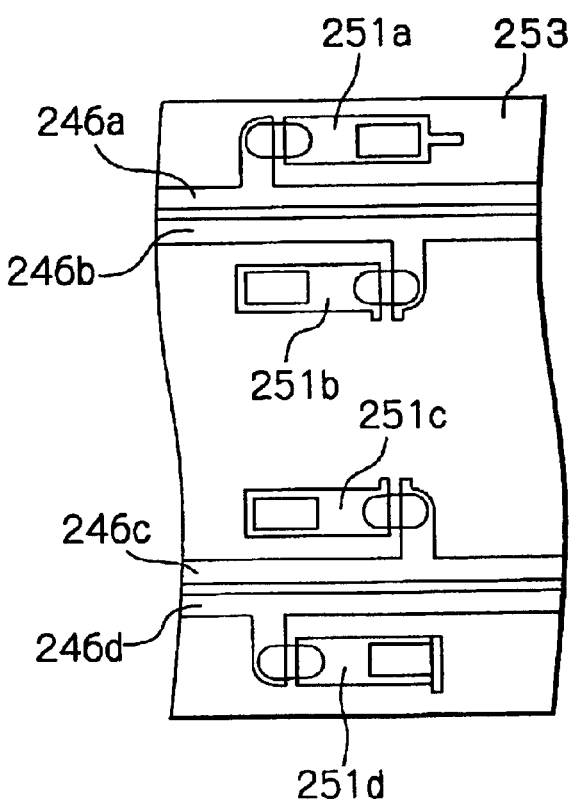
FIG. 26 is an enlarged plane view illustrating a structure of test connection pads shown in FIG. 24.

FIG. 24 illustrates a structure of an HGA as a further embodiment according to the present invention, and FIGS. 25 and 26 illustrate an enlarged structure of test connection pads shown in FIG. 24. In this embodiment, a FPC member is utilized as a lead conductor member.

As shown in FIG. 24, the HGA is assembled by fixing a FPC 253 on a suspension 240. On the FPC 253, a magnetic head slider 241 having at least one thin-film magnetic head element is preliminarily mounted at its top end section and also a drive IC chip 242 for driving the head element and for amplifying a read-out signal from the head element is preliminarily mounted on its middle section.

The suspension 240 is substantially constituted by a resilient metal flexure 243, a resilient metal load beam 244 that supports and fixes the flexure 243 at its top end section, a metal base plate 245 fixed to a base end section of the load beam 244.

The magnetic head slider 241 has the at least one thin-film magnetic head element consisting of a write head element and an MR read head element. Although it is a mere example, the size of the magnetic head slider 241 is 1.25 mm×1.0 mm×0.3 mm.

The flexure 243 has a flexible tongue (not shown) depressed by a dimple (not shown) formed on the load beam 244 and has elasticity for flexibly supporting by the tongue the magnetic head slider 241 to provide a stable attitude to the slider. The flexure 243 is made of in this embodiment a stainless steel plate (for example SUS304TA) with a thickness of about 25 μm and a substantially constant width.

The load beam 244 has elasticity for depressing the magnetic head slider 241 toward the direction of a magnetic disk in operation so as to provide a stable flying height. This load beam 244 is made of in this embodiment a resilient stainless steel plate with a thickness of about 60–65 μm and supports the flexure 243 at its top end section. The load beam 244 has a shape with a width that narrows with approaching to its top end. Fixing of the flexure 243 to the load beam 244 is performed by spot welding at a plurality of points using a laser beam for example. As will be noted, in this embodiment, the suspension has a three-pieces structure constituted by individual components of the flexure 243, the load beam 244 and the base plate 245. In such three-pieces structure, stiffness of the flexure 243 is set to be lower than that of the load beam 244.

The base plate 245 is made of a stainless steel plate or an iron plate with a thickness larger than that of the load beam 244, and is fixed to the base end section of the load beam 244 by spot welding using a laser beam for example. The HGA will be attached to each support arm (not shown) by mechanically swaging an attachment part 245a of the base plate 245 to the support arm.

The FPC 253 is tightly fixed to the load beam 244 and the flexure 243 by an adhesive. Parts of the FPC 253, located in a slanting frontward direction of the base plate 245 and located in a backward direction of the base plate 245 are floating in a space.

The FPC 253 has, although it is not shown in FIG. 24, four first trace conductors 246a–246d and four second trace conductors 247a–247d.

One ends of the first trace conductors 246a–246d are connected to four head connection pads 248a–248d formed at one end section (top end section) of the FPC 253. These head connection pads 248a–248d are electrically connected to four terminal electrodes of the magnetic head slider 241. The other ends of the first trace conductors 246a–246d are connected to four pads 249a–249d of eight IC chip connection pads 249a–249h formed on the middle section of the FPC 253 and electrically connected to eight terminal electrodes of the IC chip 242.

One ends of the second trace conductors 247a–247d are connected to the IC chip connection pads 249e–249h. The other ends of the second trace conductors 247a–247d are connected to four external connection pads 250a–250d formed on the other end section (rear end section) of the FPC 253. In this embodiment, one pair of the second trace conductors 247a and 247b are signal and control lines and the other pair of the second trace conductors 247c and 247d are power supply lines.

As apparently shown in FIGS. 25 and 26, the FPC 253 in this embodiment further has four first test connection pads 251a–251d capable of temporally shorting with the first trace conductors 246a–246d, and two second test connection pads 252a and 252b capable of temporally shorting with the second trace conductors 247a and 247b, respectively. The first test connection pads 251a–251d are arranged at a position near to the magnetic head slider 241, and the second test connection pads 252a and 252b are arranged at a position near to the IC chip 242.

The FPC 253 is formed by sequentially laminating a thin resin layer made of for example polyimide (base film layer), a patterned lead conductor layer made of for example Cu and a cover layer made of for example polyimide (over coat layer). The base film layer is tightly fixed to the load beam 244 by an adhesive such as for example a UV resin adhesive or an epoxy resin adhesive.

Within inner regions of the head connection pads 248a–248d, IC chip connection pads 249e–249h and external connection pads 250a–250e, a Ni layer and an Au layer are sequentially deposited on the Cu layer and there is no over coat layer. Similar to this, within regions of the first and second test connection pads 251a–251d, 252a and 252b, to which the measurement probes will be contact, within regions of the first and second test connection pads 251a–251d, 252a and 252b, to which the first and second trace conductors 246a–246d, 247a and 247b will be temporally connected, and within regions of the first and second trace conductors 246a–246d, 247a and 247b, to which the first and second test connection pads 251a–251d, 252a and 252b will be temporally connected, a Ni layer and an Au layer are sequentially deposited on the Cu layer and there is no over coat layer.

As shown in FIGS. 25 and 26, the first and second test connection pads 251a–251d, 252a and 252b are arranged to have spaces with the respective first and second trace conductors 246a–246d, 247a and 247b, so as to be temporally short-circuited with the first and second trace conductors 246a–246d, 247a and 247b when required. This temporal short-circuit may be established by a ball-bonding using a gold ball, or shorting using a connection pin.

Each of the first and second test connection pads 251a–251d, 252a and 252b has a size for permitting easy contact of the measurement probe. Although each test connection pad has a substantially rectangular shape in this embodiment, any shape such as another polygonal shape, an ellipse shape or a circular shape may be adopted.

It is desired that the first test connection pads 251a–251d are arranged at a position as nearer as the magnetic head slider 241 because the measured values of the current supplied to the write head element and reproduction signal from the read head element are unaffected by the trace conductors. However, if these first test connection pads 251a–251d are arranged at a position as nearer as the IC chip 242, it is possible to measure actual value of the reproduction signal applied to the IC chip 242. Thus, it is most desired that these first test connection pads 251a–251d are arranged at both positions. Whereas it is desired that the second test connection pads 252a and 252b are arranged at a position nearer the IC chip 242 because the measured values are unaffected by the trace conductors. However, if it is difficult to locate them at these positions due to no space, any optional position may be selected to form the first and second test connection pads.

Figure 27:
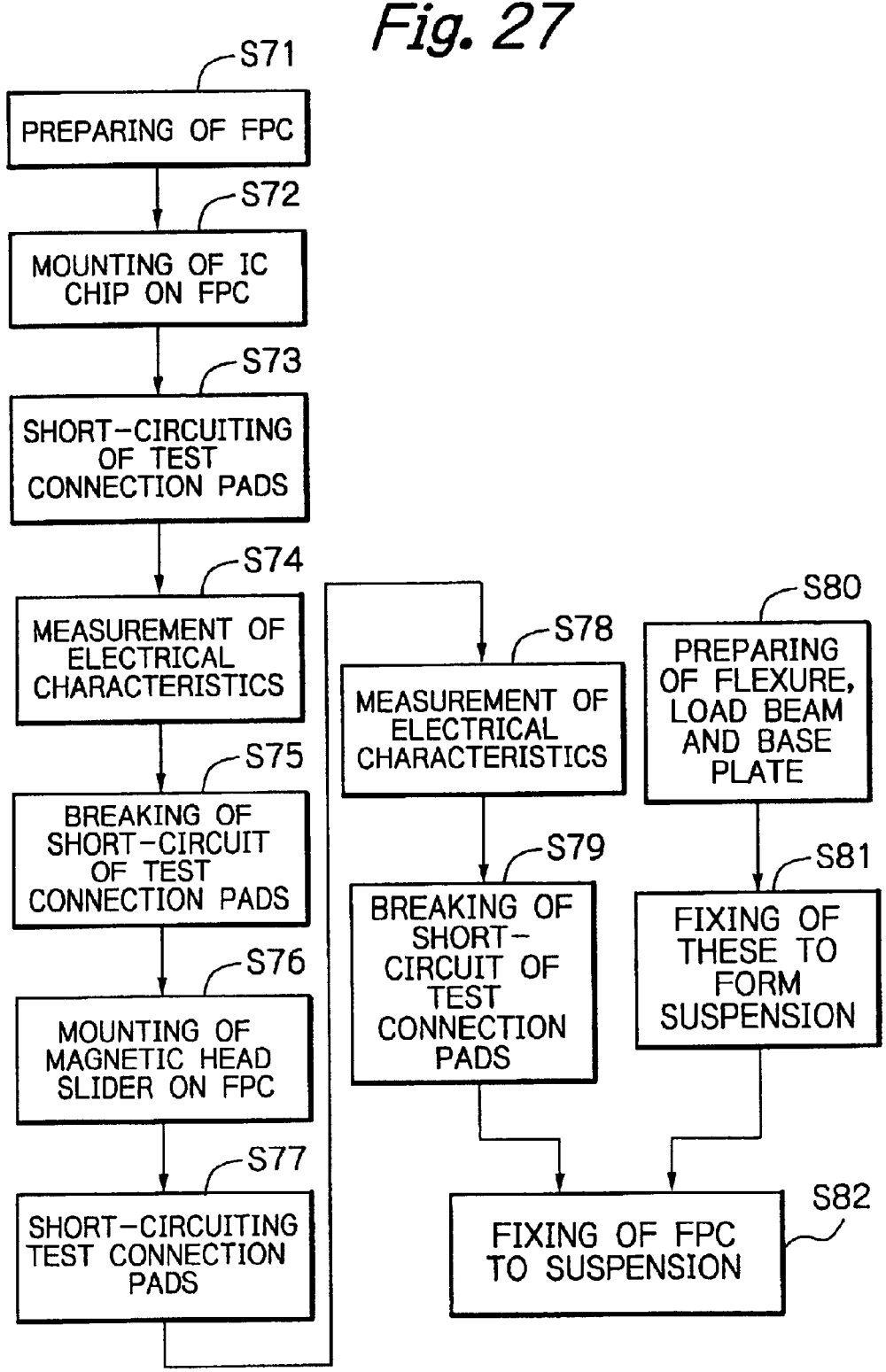
FIG. 27 is a flow chart illustrating a part of fabrication process of a manufacturing method of an HGA in the embodiment of FIG. 24.

FIG. 27 illustrates a part of fabrication process of a manufacturing method of an HGA in the embodiment of FIG. 24. Hereinafter, the manufacturing process will be described in detail with reference to this figure.

First, a FPC 253 with trace conductors and connection pads formed as aforementioned is prepared (step S71).

Then, an IC chip 242 is mounted on each FPC 253 coupled with the frame or separated from the frame (step S72). The mounting of the IC chip 242 is performed by electrically bonding its electrode terminals to IC chip connection pads 249a–249h of the FPC 253 by means of a flip-chip bonding using solder or gold bumps, and then by filling an underfill material into a space between the FPC 253 and the IC chip 242 if necessary.

Then, second test connection pads 252a and 252b and second trace conductors 247a and 247b are electrically short-circuited, respectively (step S73). These short-circuits may be achieved by gold-ball bonding or by using connection pins.

Then, measurement probes of a measuring instrument are contacted to the second test connection pads 252a and 252b for measuring signals inputted into or outputted from the IC chip 242 through the second trace conductors 247a and 247b, and thus electrical characteristics of the IC chip 242 are obtained (step S74). If it is judged that the FPC with the IC chip measured is a defective from thus obtained electrical characteristics, the IC chip may be re-mounted or adjusted, or the FPC with the IC chip may be discarded.

Thereafter, the gold balls or the solders are removed to break the short-circuiting between the second test connection pads 252a and 252b and the second trace conductors 247a and 247b (step S75).

Then, a magnetic head slider 241 is mounted on the FPC 253 (step S76). The mounting of the magnetic head slider 241 is performed by electrically connecting electrode terminals of the slider 241 to head element connection pads 248a–248d formed on the FPC 253 by means of soldering or ball-bonding.

Then, first test connection pads 251a–251d and first trace conductors 246a–246d are electrically short-circuited, respectively (step S77). These short-circuits may be achieved by gold-ball bonding or by using connection pins.

Then, measurement probes of a measuring instrument are contacted to the first test connection pads 251a and 251b for measuring signals inputted into or outputted from the MR read head element for example of the thin-film magnetic head element through the first trace conductors 246a and 246b, the measurement probes are contacted to the first test connection pads 251c and 251d for measuring signal inputted into the write head element for example of the thin-film magnetic head element through the first trace conductors 246c and 246d, or the measurement probes are contacted to these four test connection pads 251a–251d for measuring all of these signals, and thus electrical characteristics of the thin-film head element is obtained (step S78). If it is judged that the FPC with the IC chip and the magnetic head slider thus obtained electrical characteristics, the magnetic head slider may be re-mounted or adjusted, or the FPC with the IC chip and the magnetic head slider may be discarded.

Thereafter, the gold balls or the solders are removed to break the short-circuiting between the first connection pads 251a–251d and the first trace conductors 246a–246d (step S79).

On the other hands, a flexure 243, a load beam 244 and a base plate 245 are prepared (step S80).

Then, a suspension 240 is fabricated by fixing the flexure 243, the load beam 244 and the base plate 245 with each other by means of spot welding using a laser beam (step S81).

Thereafter, the FPC 253 with the IC chip 242 and the magnetic head slider 241 mounted thereon is adhered and fixed to the suspension 240, and thus the HGA is brought to completion (step S82).

The flexure, load beam and base plate of the suspension 240 is not limited to the aforementioned structure but various modifications can be adopted as a matter of course.

As will be noted according to this embodiment, the first test connection pads 251a–251d are electrically shorted to the first trace conductors 246a–246d and the measurement probes are contacted to the first test connection pads only when the electrical characteristics is measured, and also the second test connection pads 252a and 252b are electrically shorted to the second trace conductors 247a and 247b and the measurement probes are contacted to the second test connection pads only when the electrical characteristics are measured, and the short-circuits are broken after the measurements. Therefore, electrical characteristics of the IC chip and the thin-film magnetic head element can be easily measured using these test connection pads without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, all of the first test connection pads 251a–251d are temporally short-circuited to the first trace conductors 246a–246d, respectively. However, in modifications, only necessary first test connection pads may be temporally short-circuited to the second trace conductors. Also, in this embodiment, only the second test connection pads 252a and 252b capable of temporally short-circuiting to the second trace conductors 247a and 247b are formed. However, in modifications, second test connection pads capable of temporally short-circuiting to the second trace conductors 247c and 247d may be formed. Furthermore, in this embodiment, the first test connection pads 251a–251d and the second test connection pads 252a and 252b are individually used for the measurements. However, in modifications, both the first test connection pads 251a–251d and the second test connection pads 252a and 252b may be simultaneously used for the measurements of electrical characteristics.

Figure 28:
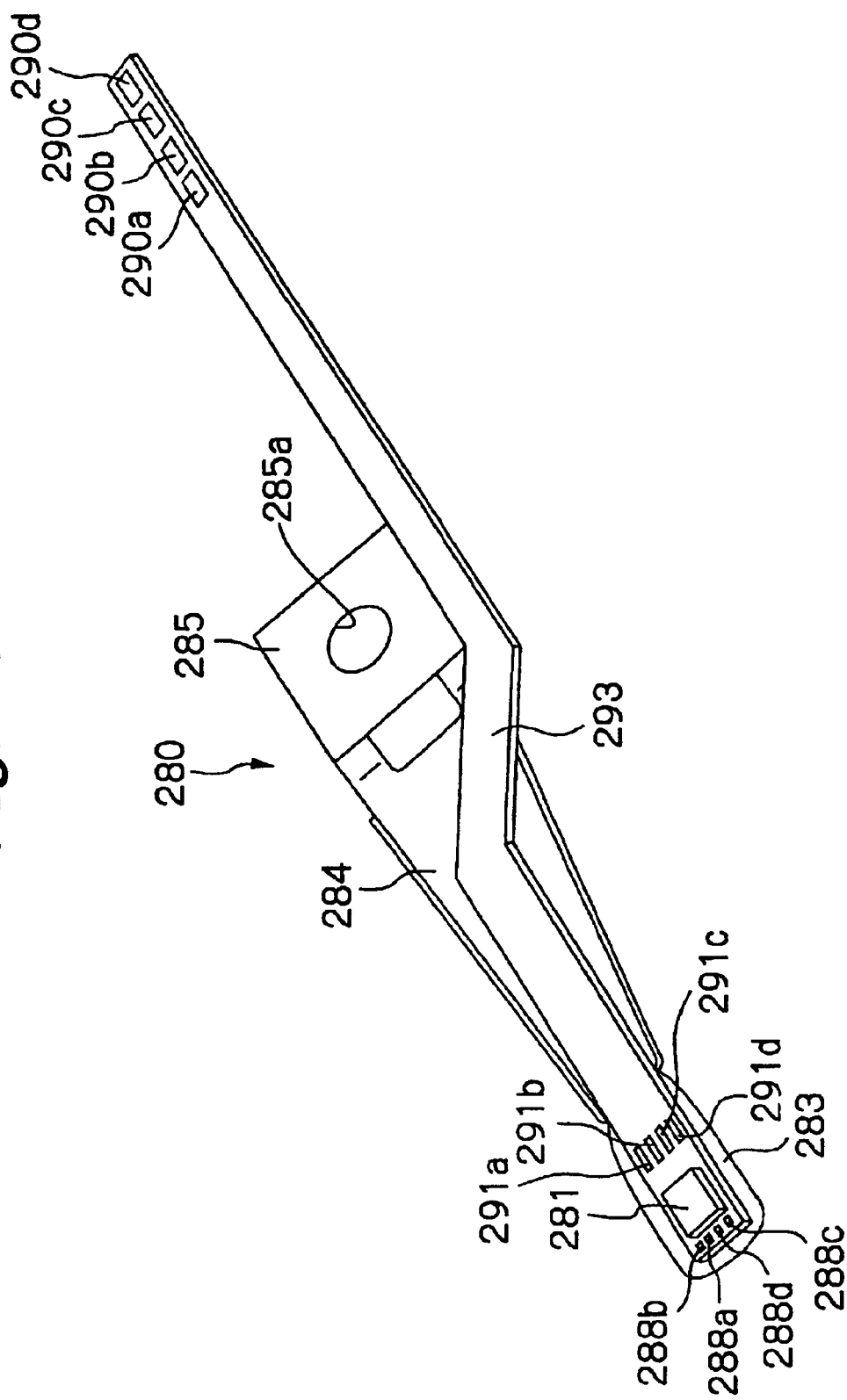
FIG. 28 is an oblique view illustrating a structure of an HGA as a still further embodiment according to the present invention.
Figure 29:
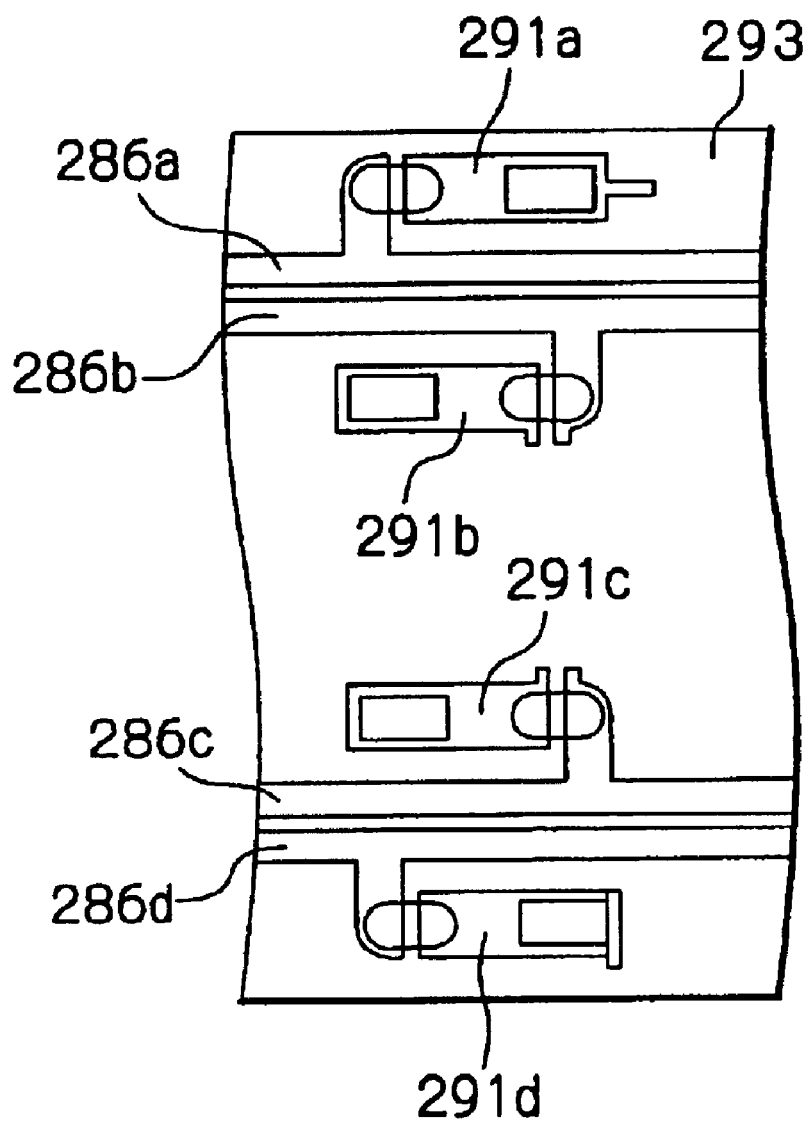
FIG. 29 is an enlarged plane view illustrating a structure of test connection pads shown in FIG. 28.

FIG. 28 illustrates a structure of an HGA as a still further embodiment according to the present invention, and FIG. 29 illustrates an enlarged structure of test connection pads shown in FIG. 28. In this embodiment, a FPC member is utilized as a lead conductor member.

As shown in FIG. 28, the HGA is assembled by fixing a FPC 293 on a suspension 280. On the FPC 293, a magnetic head slider 281 having at least one thin-film magnetic head element is preliminarily mounted at its top end section.

The suspension 280 is substantially constituted by a resilient metal flexure 283, a resilient metal load beam 284 that supports and fixes the flexure 283 at its top end section, a metal base plate 285 fixed to a base end section of the load beam 284.

The magnetic head slider 281 has the at least one thin-film magnetic head element consisting of a write head element and an MR read head element. Although it is a mere example, the size of the magnetic head slider 281 is 1.25 mm×1.0 mm×0.3 mm.

The flexure 283 has a flexible tongue (not shown) depressed by a dimple (not shown) formed on the load beam 284 and has elasticity for flexibly supporting by the tongue the magnetic head slider 281 to provide a stable attitude to the slider. The flexure 283 is made of in this embodiment a stainless steel plate (for example SUS304TA) with a thickness of about 25 µm and a substantially constant width.

The load beam 284 has elasticity for depressing the magnetic head slider 281 toward the direction of a magnetic disk in operation so as to provide a stable flying height. This load beam 284 is made of in this embodiment a resilient stainless steel plate with a thickness of about 60–65 µm and supports the flexure 283 at its top end section. The load beam 284 has a shape with a width that narrows with approaching to its top end. Fixing of the flexure 283 to the load beam 284 is performed by spot welding at a plurality of points using a laser beam for example. As will be noted, in this embodiment, the suspension has a three-pieces structure constituted by individual components of the flexure 283, the load beam 284 and the base plate 285. In such three-pieces structure, stiffness of the flexure 283 is set to be lower than that of the load beam 284.

The base plate 285 is made of a stainless steel plate or an iron plate with a thickness larger than that of the load beam 284, and is fixed to the base end section of the load beam 284 by spot welding using a laser beam for example. The HGA will be attached to each support arm (not shown) by mechanically swaging an attachment part 285a of the base plate 285 to the support arm.

The FPC 293 is tightly fixed to the load beam 284 and the flexure 283 by an adhesive. Parts of the FPC 293, located in a slanting frontward direction of the base plate 285 and located in a backward direction of the base plate 285 are floating in a space.

The FPC 293 has, although it is not shown in FIG. 28, four trace conductors 286a–286d.

One ends of the trace conductors 286a–286d are connected to four head connection pads 288a–288d formed at one end section (top end section) of the FPC 293. These head connection pads 288a–288d are electrically connected to four terminal electrodes of the magnetic head slider 281. The other ends of the trace conductors 286a–286d are connected to four external connection pads 290a–290d formed on the other end section (rear end section) of the FPC 293.

As apparently shown in FIG. 29, the FPC 293 in this embodiment further has four test connection pads 291a–291d capable of temporally shorting with the trace conductors 286a–286d, respectively. The test connection pads 291a–291d are arranged at a position near to the magnetic head slider 281.

The FPC 293 is formed by sequentially laminating a thin resin layer made of for example polyimide (base film layer), a patterned lead conductor layer made of for example Cu and a cover layer made of for example polyimide (over coat layer). The base film layer is tightly fixed to the load beam 284 by an adhesive such as for example a UV resin adhesive or an epoxy resin adhesive.

Within inner regions of the head connection pads 288a–288d and external connection pads 290a–290e, a Ni layer and an Au layer are sequentially deposited on the Cu layer and there is no over coat layer. Similar to this, within regions of the test connection pads 291a–291d, to which the measurement probes will be contact, within regions of the test connection pads 291a–291d, to which the trace conductors 286a–286d will be temporally connected, and within regions of the trace conductors 286a–286d, to which the test connection pads 291a–291d will be temporally connected, a Ni layer and an Au layer are sequentially deposited on the Cu layer and there is no over coat layer.

As shown in FIG. 29, the test connection pads 291a–291d are arranged to have spaces with the respective trace conductors 286a–286d, so as to be temporally short-circuited with the trace conductors 286a–286d when required. This temporary short-circuit may be established by a ball-bonding using a gold ball, or shorting using a connection pin.

Each of the test connection pads 291a–291d has a size for permitting easy contact of the measurement probe. Although each test connection pad has a substantially rectangular shape in this embodiment, any shape such as another polygonal shape, an ellipse shape or a circular shape may be adopted.

It is desired that the test connection pads 291a–291d are arranged at a position as nearer as the magnetic head slider 281 because the measured values of the current supplied to the write head element and reproduction signal from the read head element are unaffected by the trace conductors. However, if it is difficult to locate them at these positions due to no space, any optional position may be selected to form the test connection pads.

Figure 30:
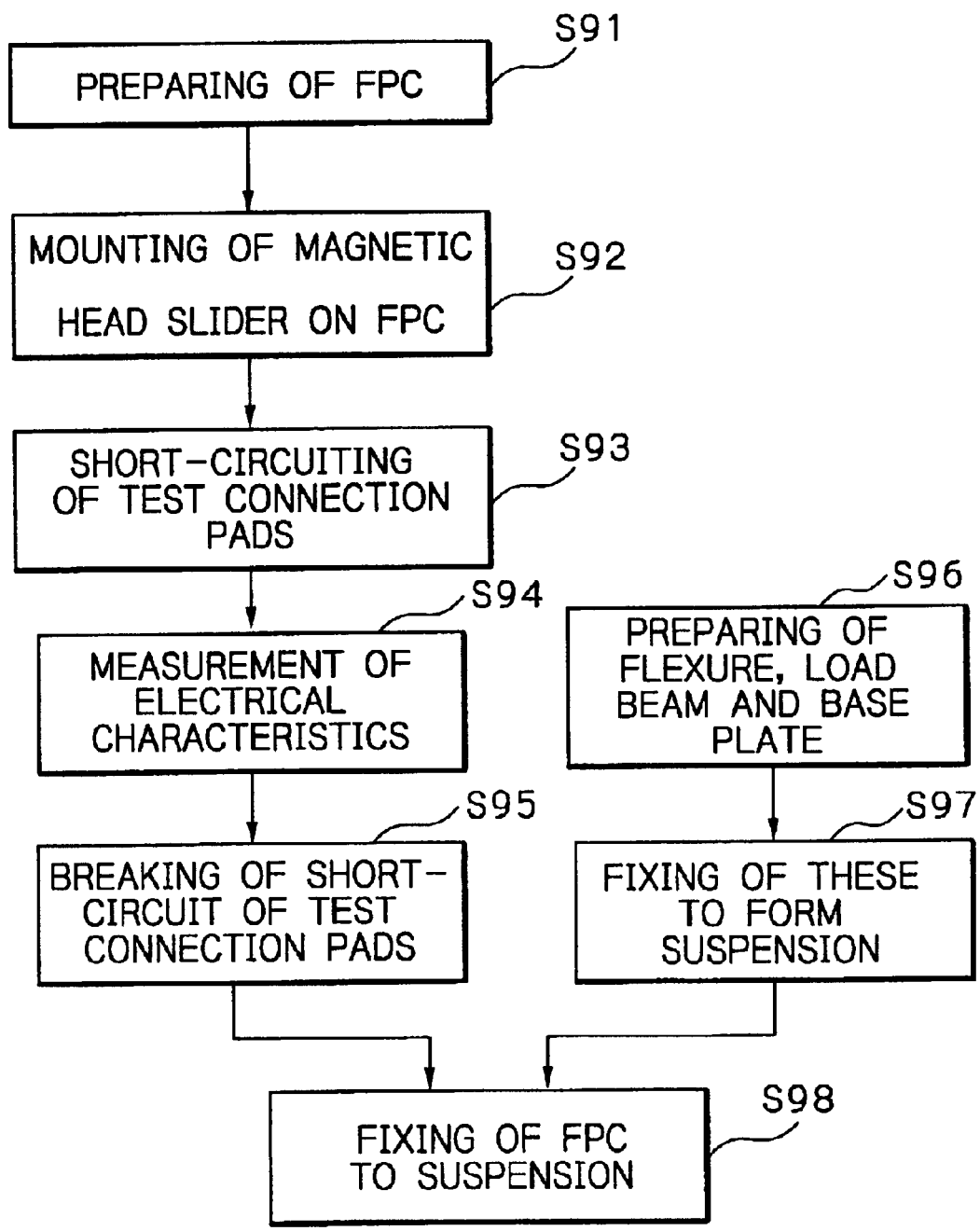
FIG. 30 is a flow chart illustrating a part of fabrication process of a manufacturing method of an HGA in the embodiment of FIG. 28.

FIG. 30 illustrates a part of fabrication process of a manufacturing method of an HGA in the embodiment of FIG. 28. Hereinafter, the manufacturing process will be described in detail with reference to this figure.

First, a FPC 293 with trace conductors and connection pads formed as aforementioned is prepared (step S91).

Then, a magnetic head slider 281 is mounted on the FPC 293 (step S92). The mounting of the magnetic head slider 281 is performed by electrically connecting electrode terminals of the slider 281 to head element connection pads 288a–288d formed on the FPC 253 by means of soldering or ball-bonding.

Then, test connection pads 291a–291d and trace conductors 286a–286d are electrically short-circuited, respectively (step S93). These short-circuits may be achieved by gold-ball bonding or by using connection pins.

Then, measurement probes of a measuring instrument are contacted to the test connection pads 291a and 291b for measuring signals inputted into or outputted from the MR read head element for example of the thin-film magnetic head element through the first trace conductors 286a and 286b, the measurement probes are contacted to the test connection pads 291c and 291d for measuring signal inputted into the write head element for example of the thin-film magnetic head element through the trace conductors 286c and 286d, or the measurement probes are contacted to these four test connection pads 291a–291d for measuring all of these signals, and thus electrical characteristics of the thin-film head element is obtained (step S94). If it is judged that the FPC with the magnetic head slider thus obtained electrical characteristics, the magnetic head slider may be re-mounted or adjusted, or the FPC with the magnetic head slider may be discarded.

Thereafter, the gold balls or the solders are removed to break the short-circuiting between the connection pads 291a–291d and the trace conductors 286a–286d (step S95).

On the other hands, a flexure 283, a load beam 284 and a base plate 285 are prepared (step S96).

Then, a suspension 280 is fabricated by fixing the flexure 283, the load beam 284 and the base plate 285 with each other by means of spot welding using a laser beam (step S97).

Thereafter, the FPC 293 with the magnetic head slider 281 mounted thereon is adhered and fixed to the suspension 280, and thus the HGA is brought to completion (step S98).

The flexure, load beam and base plate of the suspension 280 is not limited to the aforementioned structure but various modifications can be adopted as a matter of course.

As will be noted according to this embodiment, the test connection pads 291a–291d are electrically shorted to the trace conductors 286a–286d and the measurement probes are contacted to the test connection pads only when the electrical characteristics is measured, and the short-circuits are broken after the measurements. Therefore, electrical characteristics of the thin-film magnetic head element can be easily measured using these test connection pads without increasing high frequency parasitic capacitance and inductance during actual usage of the HGA even if the lead conductor member of this HGA is impedance-matched so as to be applicable at a high frequency region. As a result, in operation, reading and writing at higher frequencies can be attained and therefore sufficient increasing of recording and reproducing frequencies in order to satisfy the recent increase in recording capacity and recording density of a magnetic head apparatus can be expected.

In this embodiment, all of the test connection pads 291a–291d are temporally short-circuited to the trace conductors 286a–286d, respectively. However, in modifications, only necessary first test connection pads may be temporally short-circuited to the second trace conductors.

Figure 31:
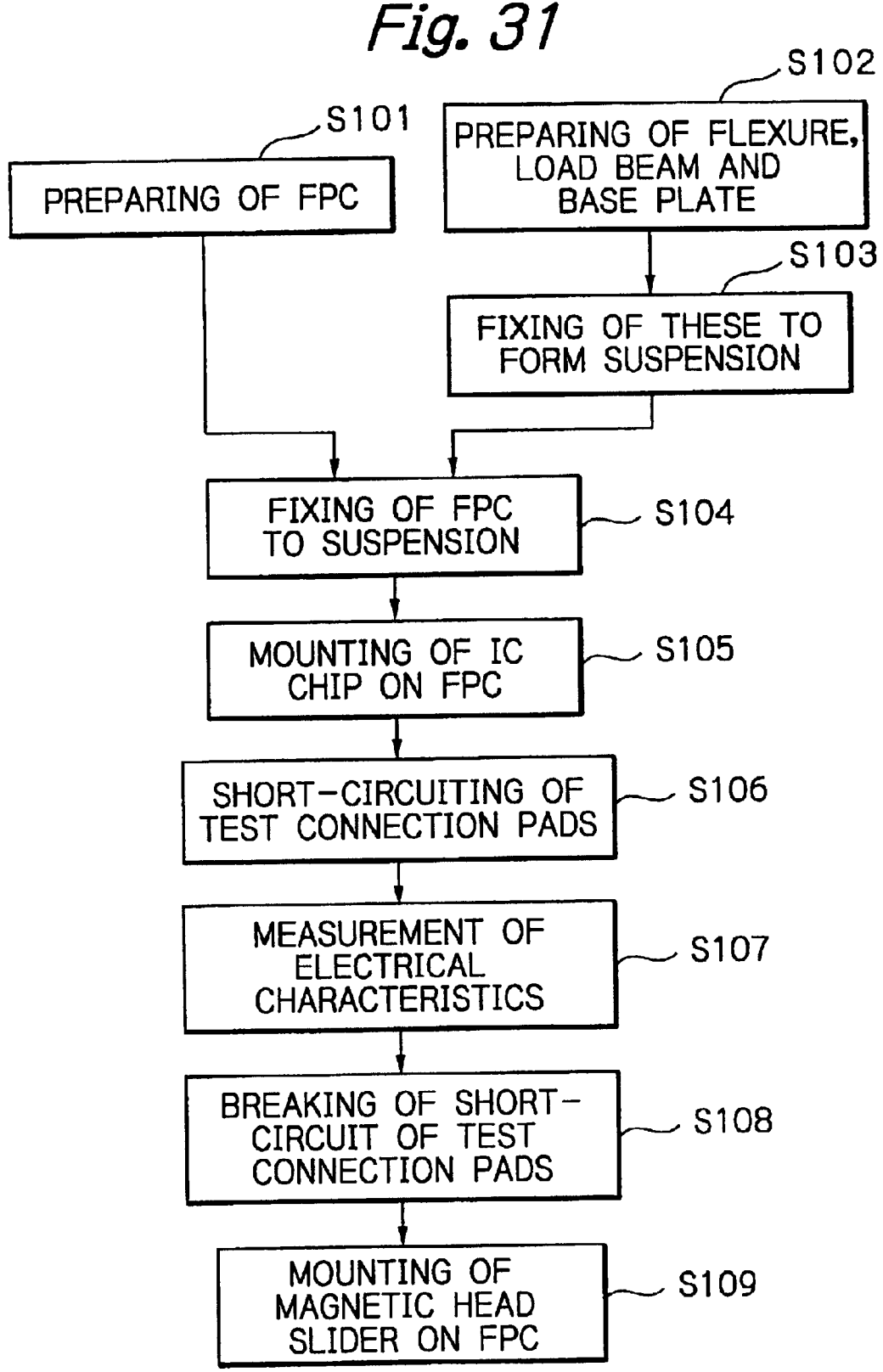
FIG. 31 is a flow chart illustrating a part of fabrication process of a manufacturing method of an HGA in a further embodiment according to the present invention.

FIG. 31 illustrates a part of fabrication process in a further embodiment of a manufacturing method of an HGA according to the present invention. The HGA finally completed is the same as that in the embodiment of FIG. 17. Thus, in this embodiment the same elements as these in the embodiment of FIG. 17 are referred as the same reference numerals.

Hereinafter, the modification in the manufacturing process will be described in detail with reference to FIG. 31.

First, a FPC 183 with trace conductors and connection pads formed as aforementioned is prepared (step S101).

On the other hands, a flexure 173, a load beam 174 and a base plate 175 are prepared (step S102).

Then, a suspension 170 is fabricated by fixing the flexure 173, the load beam 174 and the base plate 175 with each other by means of spot welding using a laser beam (step S103).

Then, the FPC 183 is adhered and fixed to the suspension 170 (step S104).

Thereafter, an IC chip 172 is mounted on the FPC 183 (step S105). The mounting of the IC chip 172 is performed by electrically bonding its electrode terminals to IC chip connection pads 179a–179h of the FPC 183 by means of a flip-chip bonding using solder or gold bumps, and then by filling an underfill material into a space between the FPC 183 and the IC chip 172 if necessary.

Then, test connection pads 182a and 182b and second trace conductors 177a and 177b are electrically short-circuited, respectively (step S106). These short-circuits may be achieved by gold-ball bonding or by using connection pins.

Then, measurement probes of a measuring instrument are contacted to the test connection pads 182a and 182b for measuring signals inputted into or outputted from the IC chip 172 through the second trace conductors 177a and 177b, and thus electrical characteristics of the IC chip 172 is obtained (step S107). If it is judged that the FPC with the IC chip measured is a defective from thus obtained electrical characteristics, the IC chip may be re-mounted or adjusted, or the FPC with the IC chip may be discarded.

Thereafter, the gold balls or the solders are removed to break the short-circuiting between the test connection pads 182a and 182b and the second trace conductors 177a and 177b (step S108).

Thereafter, a magnetic head slider 171 is mounted on the FPC 183, and thus the HGA is brought to completion (step S109). The mounting of the magnetic head slider 171 is performed by electrically connecting electrode terminals of the slider 171 to head element connection pads 178a–178d formed on the FPC 183 by means of soldering or ball-bonding.

Electrical characteristics of the thin-film magnetic head element will be thereafter measured by means of a read/write tester for example in this embodiment.

The other configurations, operations and advantages in this modification are substantially the same as those in the embodiment of FIG. 17.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lead conductor member for a thin-film magnetic head, comprising:

a plurality of head connection pads to be connected to a plurality of terminal electrodes of a thin-film magnetic head element;

a plurality of external connection pads used for external connections;

a plurality of trace conductors, one end of each of said plurality of trace conductors being connected to said plurality of head connection pads and the other ends of said plurality of trace conductors being connected to said plurality of external connection pads, respectively; and at least one pair of test connection pads formed at a position near at least one pair of trace conductors between said plurality of head connection pads and said plurality of external connection pads and capable of being temporarily and electrically short-circuited with at least one pair of trace conductors of said plurality of trace conductors, respectively.

2. The lead conductor member as claimed in claim 1, wherein each of the test connection pads has a size permitting electrical contact of a measurement probe.

3. The lead conductor member as claimed in claim 1, wherein said at least one pair of test connection pads are formed at a position nearer to said plurality of head connection pads than said plurality of external connection pads.

4. The lead conductor member as claimed in claim 1, wherein said lead conductor member consists of a lead conductor member laminated on a suspension.

5. The lead conductor member as claimed in claim 1, wherein said lead conductor member consists of a flexible print circuit member.

6. A lead conductor member for a thin-film magnetic head, comprising:
   a plurality of head connection pads to be connected to a plurality of terminal electrodes of a thin-film magnetic head element;
   a plurality of IC chip connection pads to be connected to a plurality of terminal electrodes of a head IC chip;
   a plurality of external connection pads used for external connections;
   a plurality of first trace conductors, one end of each of said plurality of first trace conductors being connected to said plurality of head connection pads and the other ends of said plurality of first trace conductors being connected to said plurality of IC chip connection pads, respectively;
   a plurality of second trace conductors, one end of each of said plurality of second trace conductors being connected to said plurality of IC chip connection pads and the other ends of said plurality of second trace conductors being connected to said plurality of external connection pads, respectively; and
   at least one pair of test connection pads formed at a position near at least one pair of trace conductors of said plurality of first trace conductors or said plurality of second trace conductors and between said plurality of head connection pads and said plurality of external connection pads and capable of being temporarily tem-porarily and electrically short-circuited with at least one pair of trace conductors of said plurality of first trace conductors or said plurality of second trace conductors, respectively.

7. The lead conductor member as claimed in claim 6, wherein each of the test connection pads has a size permitting electrical contact of a measurement probe.

8. The lead conductor member as claimed in claim 6, wherein said at least one pair of test connection pads is formed nearer said plurality of head connection pads than said plurality of IC chip connection pads.

9. The lead conductor member as claimed in claim 6, wherein said at least one pair of test connection pads is formed nearer said plurality of IC chip connection pads than said plurality of head connection pads.

10. The lead conductor member as claimed in claim 6, wherein said at least one pair of test connection pads is formed nearer said plurality of IC chip connection pads than said plurality of external connection pads.

11. The lead conductor member as claimed in claim 6, wherein said lead conductor member consists of a lead conductor member laminated on a suspension.

12. The lead conductor member as claimed in claim 6, wherein said lead conductor member consists of a flexible print circuit member.

13. A head gimbal assembly, including a magnetic head slider with at least one thin-film magnetic head element, a suspension for supporting said magnetic head slider, and a lead conductor member supported by said suspension,
   said lead conductor member comprising:
   a plurality of head connection pads to be connected to a plurality of terminal electrodes of the thin-film magnetic head element;
   a plurality of external connection pads used for external connections;
   a plurality of trace conductors, one end of each of said plurality of trace conductors being connected to said plurality of head connection pads and the other ends of said plurality of trace conductors being connected to said plurality of external connection pads, respectively; and
   at least one pair of test connection pads formed at a position near at least one pair of trace conductors between said plurality of head connection pads and said plurality of external connection pads and capable of being temporarily and electrically short-circuited with said at least one pair of trace conductors of said plurality of trace conductors, respectively.

14. The head gimbal assembly as claimed in claim 13, wherein each of the test connection pads has a size permitting electrical contact of a measurement probe.

15. The head gimbal assembly as claimed in claim 13, wherein said at least one pair of test connection pads are formed at a position nearer said plurality of head connection pads than said plurality of external connection pads.

16. The head gimbal assembly as claimed in claim 13, wherein said lead conductor member consists of a lead conductor member laminated on said suspension.

17. The head gimbal assembly as claimed in claim 13, wherein said lead conductor member consists of a flexible print circuit member.

18. A head gimbal assembly including a magnetic head slider with at least one thin-film magnetic head element, a head IC chip, a suspension for supporting said magnetic head slider, and a lead conductor member supported by said suspension,
   said lead conductor member comprising:
   a plurality of head connection pads connected to a plurality of terminal electrodes of the thin-film magnetic head element;
   a plurality of IC chip connection pads to be connected to a plurality of terminal electrodes of the head IC chip;
   a plurality of external connection pads used for external connections;
   a plurality of first trace conductors, one end of each of said plurality of first trace conductors being connected to said plurality of head connection pads and the other ends of said plurality of first trace conductors being connected to said plurality of IC chip connection pads, respectively;
   a plurality of second trace conductors, one end of each of said plurality of second trace conductors being connected to said plurality of IC chip connection pads and the other ends of said plurality of second trace conductors being connected to said plurality of external connection pads, respectively; and
   at least one pair of test connection pads formed at a position near at least one pair of trace conductors of said plurality of first trace conductors or said plurality of second trace conductors and between said plurality of head connection pads and said plurality of external connection pads and capable of being temporarily and electrically short-circuited with at least one pair of trace conductors of said plurality of first trace conductors or said plurality of second trace conductors, respectively.

19. The head gimbal assembly as claimed in claim 18, wherein each of the test connection pads has a size permitting electrical contact of a measurement probe.

20. The head gimbal assembly as claimed in claim 18, wherein said at least one pair of test connection pads is formed nearer said plurality of head connection pads than said plurality of IC chip connection pads.

21. The head gimbal assembly as claimed in claim 18, wherein said at least one pair of test connection pads is formed nearer said plurality of IC chip connection pads than said plurality of head connection pads.

22. The head gimbal assembly as claimed in claim 18, wherein said at least one pair of test connection pads is formed nearer said plurality of IC chip connection pads than said plurality of external connection pads.

23. The head gimbal assembly as claimed in claim 18, wherein said lead conductor member consists of a lead conductor member laminated on the suspension.

24. The head gimbal assembly as claimed in claim 18, wherein said lead conductor member consists of a flexible print circuit member.

* * * * *